US012613701B2

(12) United States Patent
Boemer et al.

(10) Patent No.: US 12,613,701 B2
(45) Date of Patent: Apr. 28, 2026

(54) APPARATUS AND METHOD FOR VECTOR PACKED CONCATENATE AND SHIFT OF SPECIFIC PORTIONS OF QUADWORDS

(71) Applicant: Intel Corporation, Santa Clara, CA (US)

(72) Inventors: Fabian Boemer, San Diego, CA (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 887 days.

(21) Appl. No.: 17/560,554

(22) Filed: Dec. 23, 2021

(65) Prior Publication Data

US 2023/0205528 A1    Jun. 29, 2023

(51) Int. Cl.
*G06F 9/30* (2018.01)

(52) U.S. Cl.
CPC ...... *G06F 9/30145* (2013.01); *G06F 9/30018* (2013.01); *G06F 9/30032* (2013.01);
(Continued)

(58) Field of Classification Search
CPC ............ G06F 9/30032; G06F 9/30018; G06F 9/30038; G06F 9/30112; G06F 9/30145; G06F 9/30036
See application file for complete search history.

(56) References Cited

U.S. PATENT DOCUMENTS 6,631,391 B1 * 10/2003 Inabata ................... G06F 7/483
                                                       708/501
7,660,973 B2    2/2010 Hansen et al.
(Continued)

FOREIGN PATENT DOCUMENTS

CN        115809468 A    3/2023
CN        116069291 A    5/2023
(Continued)

OTHER PUBLICATIONS

Fortin et al., "High performance SIMD modular arithmetic for polynomial evaluation", HAL, Open Science, Concurrency and Computation Practice and Experience, vol. 33, No. 1, Apr. 23, 2020, 25 pages.
(Continued)

*Primary Examiner* — Michael J Metzger
(74) *Attorney, Agent, or Firm* — NICHOLSON DE VOS WEBSTER & ELLIOTT LLP

(57) ABSTRACT

Apparatus and method for performing vector packed concatenate and shift of portions of quadwords are described herein. An apparatus embodiment includes decoder circuitry to decode a first instruction and execution circuitry to execute the decoded instruction. The execute circuitry includes concatenation circuitry to concatenate a first field from each of a first plurality of data elements with a second field from a corresponding data element of the second plurality of data elements to generate a plurality of concatenated results, and shift circuitry to shift each of the plurality of concatenated results by a number of bit positions specified by a corresponding shift value to generate a plurality of shifted results, wherein a select plurality of bits from each of the plurality of shifted results is stored in a corresponding data element position of a destination register.

25 Claims, 18 Drawing Sheets

(52) U.S. Cl.
CPC ...... *G06F 9/30036* (2013.01); *G06F 9/30038*
(2023.08); *G06F 9/30101* (2013.01); *G06F*
*9/30196* (2013.01)

(56) References Cited

U.S. PATENT DOCUMENTS

| | | | | |
|---|---|---|---|---|
| 7,685,212 | B2 * | 3/2010 | Sebot | G06F 9/30032 |
| | | | | 708/200 |
| 10,318,298 | B2 * | 6/2019 | Madduri | G06F 9/30038 |
| 10,763,891 | B2 * | 9/2020 | Madduri | H03M 7/24 |
| 2002/0040427 | A1 * | 4/2002 | Symes | G06F 9/30025 |
| | | | | 712/E9.034 |
| 2003/0167460 | A1 * | 9/2003 | Desai | G06F 9/3853 |
| | | | | 712/E9.034 |
| 2008/0184007 | A1 * | 7/2008 | Codrescu | G06F 9/30036 |
| | | | | 712/E9.034 |
| 2012/0254589 | A1 * | 10/2012 | Corbal San Adrian | |
| | | | | G06F 9/30032 |
| | | | | 712/E9.034 |
| 2013/0067202 | A1 * | 3/2013 | Henry | G06F 9/30174 |
| | | | | 712/E9.016 |
| 2015/0261534 | A1 | 9/2015 | Uliel et al. | |
| 2017/0010893 | A1 * | 1/2017 | Quinnell | G06F 9/30038 |
| 2019/0042236 | A1 * | 2/2019 | Heinecke | G06F 9/30036 |
| 2019/0196787 | A1 * | 6/2019 | Madduri | G06F 9/30145 |
| 2023/0081763 | A1 | 3/2023 | Boemer et al. | |
| 2023/0136291 | A1 | 5/2023 | Boemer et al. | |
| 2023/0140257 | A1 | 5/2023 | Boemer et al. | |

FOREIGN PATENT DOCUMENTS

| | | | | |
|---|---|---|---|---|
| CN | 116069390 | A | 5/2023 | |
| DE | 102022124466 | A1 | 5/2023 | |
| EP | 2919112 | A2 * | 9/2015 | ........ G06F 9/30145 |
| EP | 4152147 | A1 | 3/2023 | |
| EP | 4174643 | A1 | 5/2023 | |
| KR | 10-2023-0062369 | A | 5/2023 | |
| WO | 03/38601 | A1 | 5/2003 | |

OTHER PUBLICATIONS

Géraud et al., "Double-Speed Barrett Moduli", HAL, Open Science, LNCS Essays on the New Codebreakers, vol. 9100, Oct. 15, 2015, 12 pages.

Intel, "Intel® Homomorphic Encryption Acceleration Library accelerates modular arithmetic operations used in homomorphic encryption", Available Online at <https://github.com/intel/hexl>, Retrieved on Feb. 25, 2022, 11 pages.

European Search Report and Search Opinion, EP App. No. 22205080.9, Mar. 24, 2023, 10 pages.

Cambou et al., "Post Quantum Cryptographic Keys Generated with Physical Unclonable Functions", MDPI, Mar. 21, 2021, 20 Pages.

Github, "Microsoft Seal", available online at <https://web.archive.org/web/20211207195545/https://github.com/microsoft/seal>, Dec. 7, 2021, 14 pages.

Office Action, EP App. No. 22205080.9, Feb. 2, 2026, 8 pages.

* cited by examiner

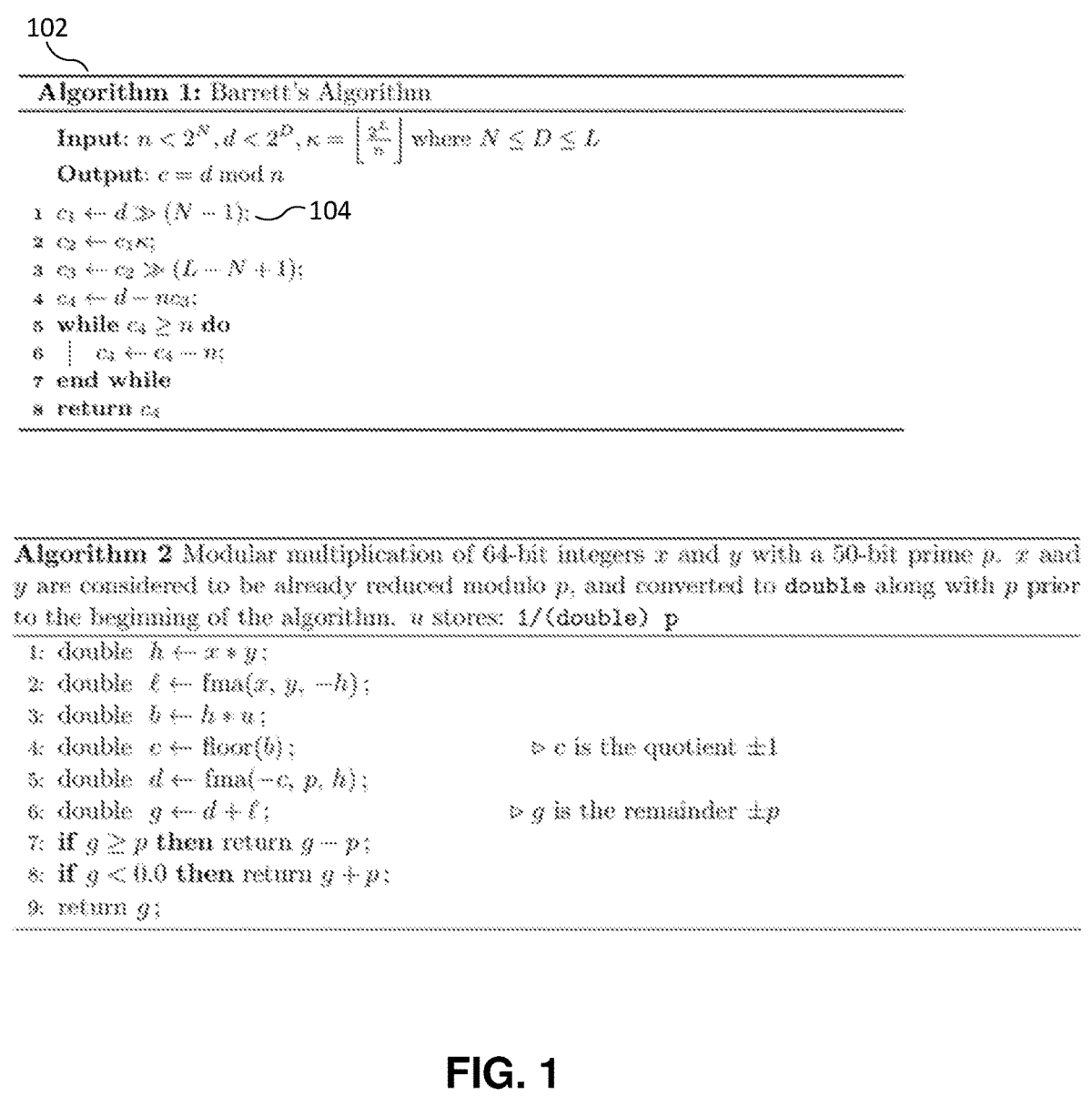

102

Algorithm 1: Barrett's Algorithm

Input: $n < 2^N, d < 2^D, \kappa = \left\lfloor \frac{2^L}{n} \right\rfloor$ where $N \leq D \leq L$

Output: $c = d \bmod n$

1   $c_1 \leftarrow d \gg (N - 1)$;     104
2   $c_2 \leftarrow c_1 \kappa$;
3   $c_3 \leftarrow c_2 \gg (L - N + 1)$;
4   $c_4 \leftarrow d - n c_3$;
5   while $c_4 \geq n$ do
6   |   $c_4 \leftarrow c_4 - n$;
7   end while
8   return $c_4$

Algorithm 2 Modular multiplication of 64-bit integers $x$ and $y$ with a 50-bit prime $p$. $x$ and $y$ are considered to be already reduced modulo $p$, and converted to double along with $p$ prior to the beginning of the algorithm. $u$ stores: $1/(\texttt{double})$ $p$ 1:   double   $h \leftarrow x * y$;
2:   double   $\ell \leftarrow \text{fma}(x, y, -h)$;
3:   double   $b \leftarrow h * u$;
4:   double   $c \leftarrow \text{floor}(b)$;          $\triangleright$ $c$ is the quotient $\pm 1$
5:   double   $d \leftarrow \text{fma}(-c, p, h)$;
6:   double   $g \leftarrow d + \ell$;          $\triangleright$ $g$ is the remainder $\pm p$
7:   if $g \geq p$ then return $g - p$;
8:   if $g < 0.0$ then return $g + p$;
9:   return $g$;

FIG. 1

```
// Compute product
_m512i vprod_hi = _mm512_madd52hi_eu64(zero, v_operand1, voperand2);
_m512i vprod_lo = _mm512_madd52lo_eu64(zero, v_operand1, voperand2);

_m512i c1_lo = _mm512_srli_epi64(vprod_lo, Nm1);
_m512i c1_hi = _mm512_srli_epi64(vprod_hi, Nm1);
_m512i c1 = _mm512_or_epi64(c1_lo, c1_hi);

// L − N + 1 == 52, so we only need high 52 bits
_m512i c3 = _mm512_madd52hi_epu64(zero, c1, v_barr_lo);

// C4 = prod_lo − (p * c3)_lo
_m512i v_result = _mm512_madd52lo_epu64(vprod_lo, c3, v_neg_mod);
v_result = _mm512_madd52lo_epu64(vprod_lo, c3, v_neg_mod);
// Clear high 12 bits from result
v_result = _mm512_and_epi64(v_result, two_pow52_min1);

// Reduce result to (0, q)
_m512i v_result_minus_q = _mm512_sub_epi64(v_result, v_modulus);
v_result = _mm512_min_epu64(v_result, v_result_minus_q);
```

1020                                                          1010

```
// Compute product
_m512i vprod_hi = _mm512_madd52hi_eu64(zero, v_operand1, voperand2);
_m512i vprod_lo = _mm512_madd52lo_eu64(zero, v_operand1, voperand2);

_m512 c1 = _mm512_shrdi52_epi64(v_prod_lo, v_prod_hi, Nm1);      }— 1022
// Replaces the three commented-out instructions below
//_m512i c1_lo = _mm512_srli_epi64(vprod_lo, Nm1);               }
//_m512i c1_hi = _mm512_srli_epi64(vprod_hi, Nm1);               }— 1024
//_m512i c1 = _mm512_or_epi64(c1_lo, c1_hi);                     }

// L − N + 1 == 52, so we only need high 52 bits
_m512i c3 = _mm512_madd52hi_epu64(zero, c1, v_barr_lo);

// C4 = prod_lo − (p * c3)_lo
_m512i v_result = _mm512_madd52lo_epu64(vprod_lo, c3, v_neg_mod);
v_result = _mm512_madd52lo_epu64(vprod_lo, c3, v_neg_mod);
// Clear high 12 bits from result
v_result = _mm512_and_epi64(v_result, two_pow52_min1);

// Reduce result to (0, q)
_m512i v_result_minus_q = _mm512_sub_epi64(v_result, v_modulus);
v_result = _mm512_min_epu64(v_result, v_result_minus_q);
```

FIG. 10

| | POLYNOMIAL SIZE | | |
|---|---|---|---|
| | 4096 | 8192 | 16384 |
| EXISTING ISA | 1.03 | 2.04 | 4.05 |
| NEW ISA | 0.937 | 1.83 | 3.64 |
| IMPROVEMENT | 1.09X | 1.11X | 1.11X |

FIG. 11

APPARATUS AND METHOD FOR VECTOR PACKED CONCATENATE AND SHIFT OF SPECIFIC PORTIONS OF QUADWORDS

TECHNICAL FIELD

Embodiments of the invention described herein relate generally to the field of computer processors. In particular, the disclosure relates to the instruction set architecture for performing vector packed concatenate and shift of specific portions of quadwords.

BACKGROUND ART

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale CA implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

The invention may best be understood by referring to the following description and accompanying drawings that are used to illustrate embodiments of the invention. In the drawings:

FIG. 1 illustrates a formulation of the element-wise modular multiplication;

FIG. 10 illustrate a comparison of two implementations of element-wise modular multiplication according to an embodiment;

FIG. 11 illustrates the performance improvements associated with conducting element-wise modular multiplication using embodiments of the vector packed concatenate and shift instruction;

DETAILED DESCRIPTION

Figure 2:
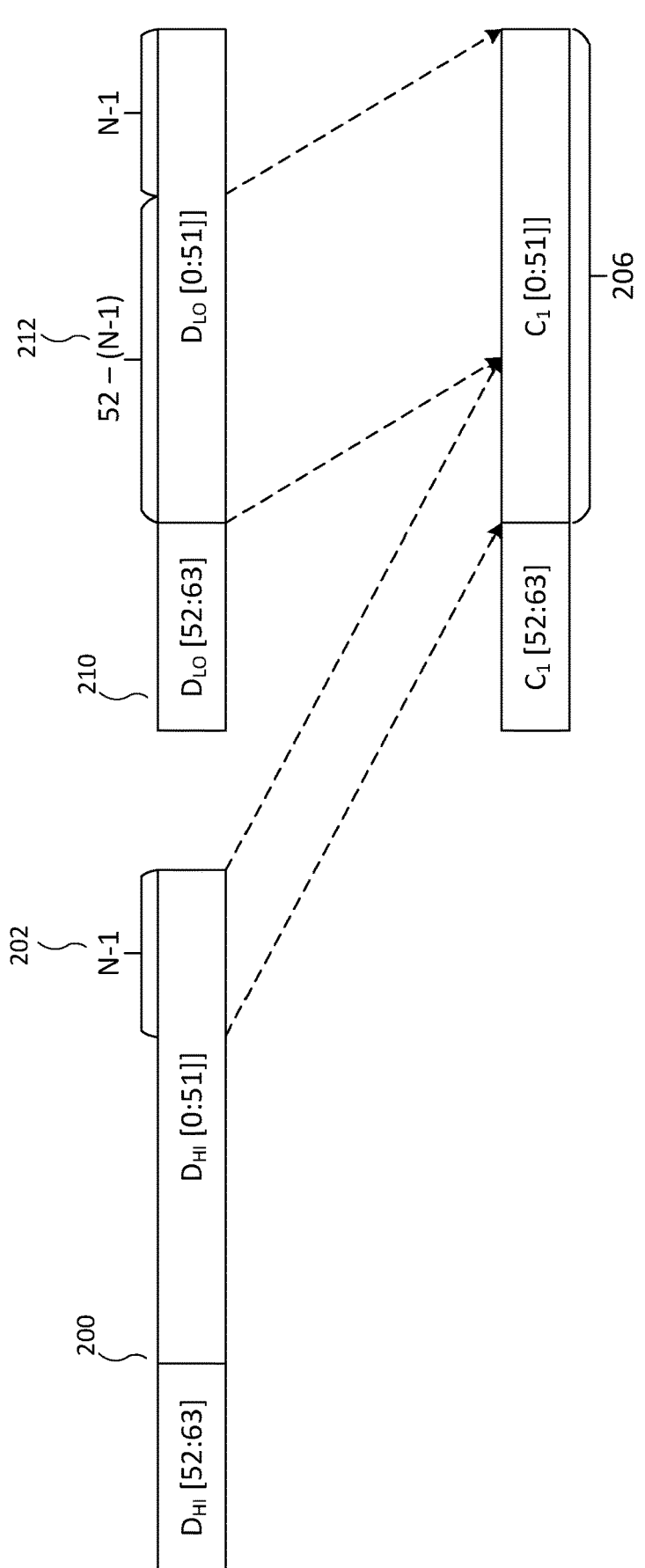
FIG. 2 is a block diagram illustrating the computation of a value $c_1$ used in element-wise modular multiplication.

Embodiments of apparatus and method for vector packed concatenate and shift of specific portions of quadwords are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Privacy-preserving machine learning (PPML) is a key up-and-coming trend aimed to enable data learning without sacrificing privacy. Techniques implemented as part of PPML include Intel® Software Guard Extensions (Intel® SGX), federated learning, secure multi-party computation, and homomorphic encryption (HE). In particular, HE is a form of encryption that enables computation on encrypted data without having to first decrypt it. Recent studies have shown an increasing interest in fully homomorphic encryption (FHE). This is especially true in the finance industry where financial crime compliance can cost banking institutions upwards of $180 billion per year. To help alleviate this burden, which is mostly driven by the high cost of labor, automation techniques such as HE are being deployed to help reduce cost.

As the usage of HE increases, the need to improve its efficiency also increases. One of the key bottlenecks in many HE applications is the polynomial multiplication in the finite field $Zq[X]/(X^N+1)$, also known as the polynomials of degree at most $N-1$ whose coefficients are integers mod q. To speed up polynomial multiplication, the technique of negacyclic number-theoretic-transform (NTT) is often used. This includes both the forward transform and the inverse transform. In particular, the multiplication of two polynomials $f(x)*g(x)$ is generally computed as $InvNTT(FwdNTT(f)\odot FwdNTT(g))$, where $\odot$ indicates element-wise vector-vector modular multiplication.

Aspects of the present disclosure introduces a set of new instructions to help optimize element-wise modular multiplication. For example, some these new instructions may, in a single execution, perform concatenation and shift of specific bits selected from pairs of packed data elements from two different sources. The specific bits may be a field of particular interest out of the multiple fields that are in each data element. Some instructions may additionally zero extend the specific bits and/or perform masking operations on the packed data elements. The use of these new instructions has the potential to improve modular multiplication performance by 9-11%.

FIG. 1 shows the formulation of element-wise modular multiplication. Specifically, the top of FIG. 1 shows Barrett's Algorithm 102. Barrett reduction is a well-known method to speed up modular multiplication by pre-computing a Barrett factor $k=floor(2^L/n)$. This is particularly useful in cases where the modulus is reused many times, as is the case in a typical HE workload. According to an embodiment, particular focus is placed on the setting where the modulus n is less than $2^{50}$. In this setting, one difficulty of Barrett's integer-based algorithm 102 is computing $c_1=d>>(N-1)$

104. Here, d is a multi-word integer. By choosing $N=ceil(log 2(n))$, one can ensure that $c_1<2^{52}$.

Ther AVX512 implementation of both the floating-point and integer-based algorithms in Intel® Homomorphic Encryption Acceleration Library (Intel® HEXL) compute the modular multiplication simultaneously across all eight 64-bit lanes. As such, for the integer-based implementation, the high and low 52-bits of the multi-word product d are stored in separate 64-bit integers (called $d_{hi}$, and $d_{lo}$, respectively) within the AVX512 512-bit integer datatypes. For example, as illustrated in FIG. 2, the high 52-bits of multi-word product d is store in $d_{hi}$ 200, while the low 52-bits is store separately in $d_{lo}$ 210. Moreover, $c_1$ is generated by a combination of $N-1$ bits 202 from $d_{hi}$ with $52-(N-1)$ bits 212 from $d_{lo}$, which together form the lower 52 bits 206.

Figure 3:
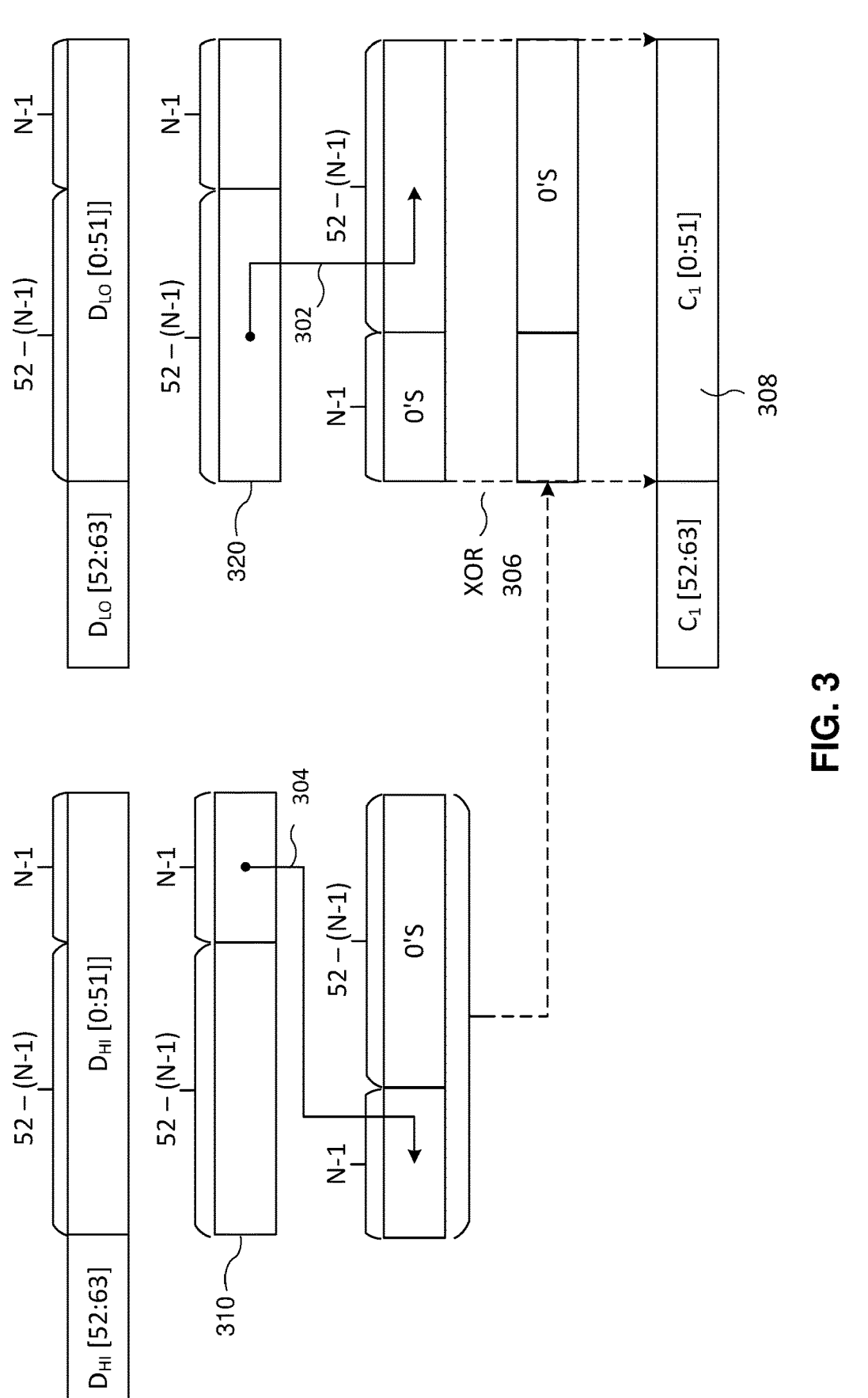
FIG. 3 is a block diagram illustrating a set of operations for computing the value $c_1$ used in element-wise modular multiplication according to an embodiment.
Figure 4:
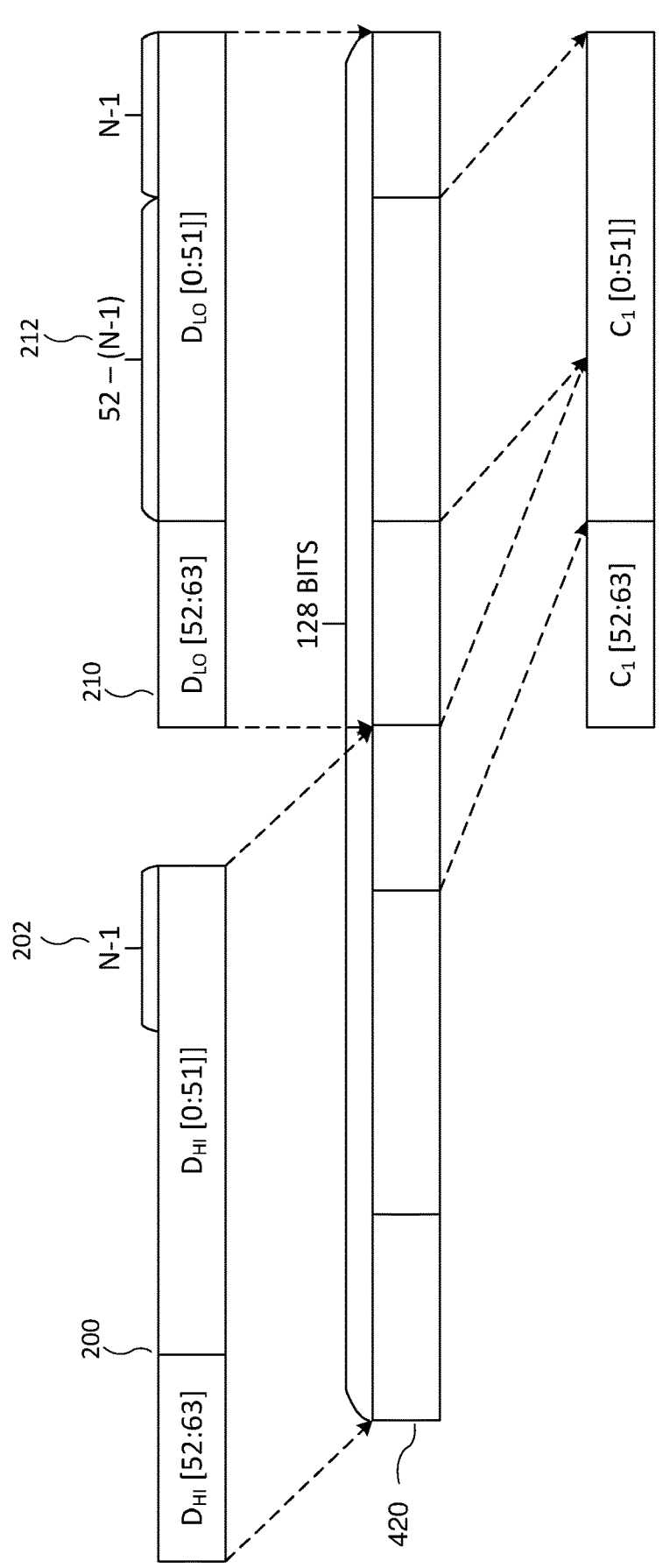
FIG. 4 is a block diagram illustrating another set of operations for computing the value $c_1$ in accordance with an embodiment.

One way to compute the lower 52 bits of $c_1$, as illustrated in FIG. 3, is to perform a shift 302 of the lower 52 bits 320 of $d_{lo}$ right by $N-1$ (filling in zeros for the top bits), a shift 304 of the lower 52 bits 310 of $d_{hi}$ left by $(52-(N-1))$ (filling zeros for lower bits), and XOR 306 the two shifted values to generate the result $c_1[0:51]$ 308. However, current instruction set architectures (ISAs) do not have support for dual-source concatenation and shift of specific number of bits that is less than the length of one data lane. Rather, instructions such as vpshridq and vpshldq operate on the full length of the data lane (e.g., 64 bits). For example, as shown in FIG. 4, all 64 bits of $d_{hi}$ 200 are concatenated with all 64 bits $d_{lo}$ 210 to generate an intermediary result 420. As such, additional operations are required to extract the desired bits from the intermediate result 420, not to mention the additional space needed to store the extra unused bits.

Figure 5:
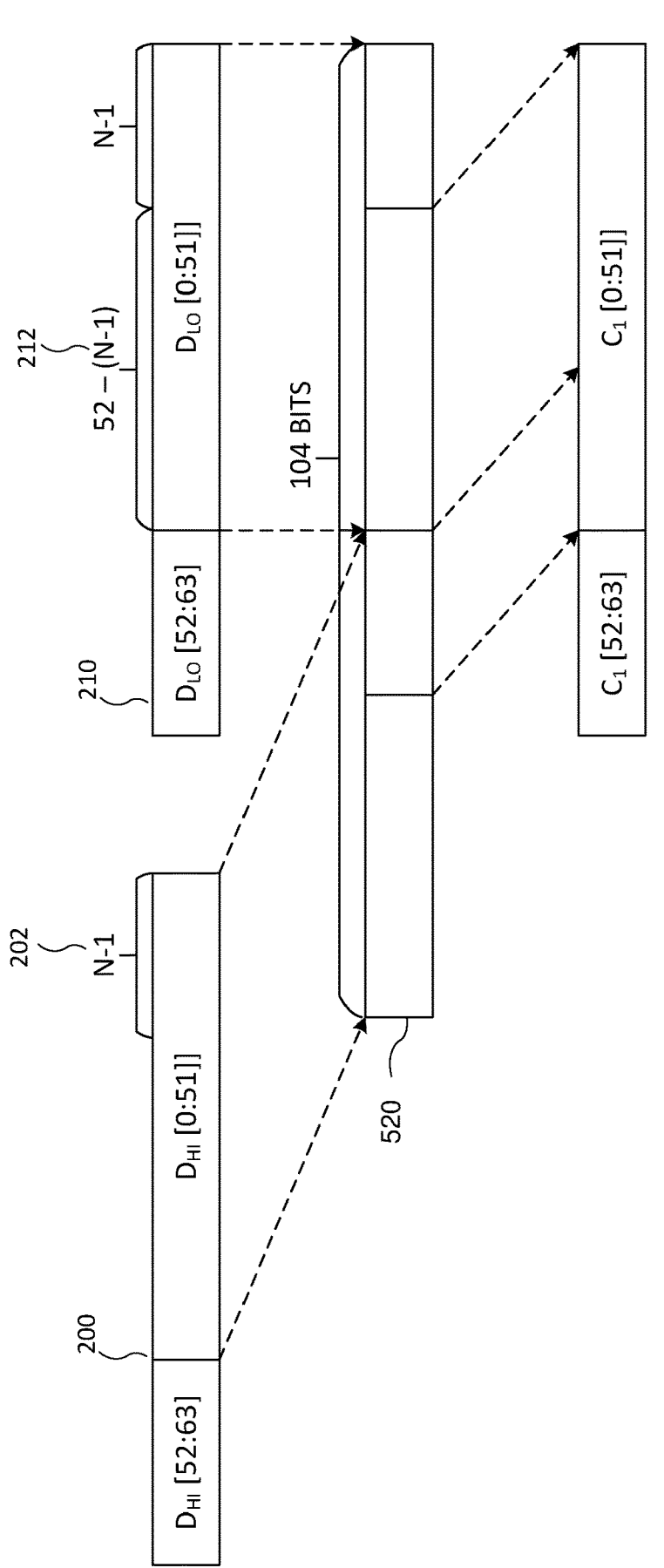
FIG. 5 illustrates the operations associated computing the value $c_1$ using vector packed concatenation and shift instruction according to an embodiment.

In contrast, aspects of the present disclosure include a set of instructions designed to speed up element-wise modular multiplication. For example, as illustrated in FIG. 5, embodiments of the instruction allow specific number of bits from each of the two sources (e.g., lower 52 bits from each $d_{hi}$, and $d_{lo}$) to be concatenated and shifted to extract the desired result (e.g., lower 52 bits of $c_1$). As shown, the lower 52 bits from $d_{hi}$, and $d_{lo}$ are combined to form a 104-bit intermediate result 520 rather than a 128-bit intermediate result 420 of FIG. 4. The shorter intermediate result 520 not only requires less storage space but also can be more easily operated to extract the desired result.

The following Table provides a quick view of some of the proposed embodiments of the instructions:

| Instruction | Shorthand |
| --- | --- |
| vpshridq52z/vpshrvdq52z | dst = ZeroExtend64(((lo52(b) ‖ lo52(a)) >> c[5:0])[0:51]) |
| vpshridq52/vpshrivdq52 | dst = (b ‖ lo52(a)) >> c[5:07)[0:63] |
| vpshlidq52z/vpshlvdq52z | dst = ZeroExtend64(((lo52(b) ‖ lo52(a)) << c[5:0])[103:52]) |
| vpshridq52/vpshrivdq52 | dst = (lo52(b) ‖ a) << c[5:0])[127:64] |

Details of each instruction will be presented further below. To allow for easier identification of these instructions, a simple naming convention is used. For example, in the respective names of these instructions, "shr" indicates "shift right", "shl" indicates "shift left", "i" indicates fixed integer shift, "v" indicates a variable integer shift, and "z" indicates zeroing the top bits of the result. Each of the instructions may be associated with an opcode, which may be used to uniquely identify the instruction to a decoder or execution unit. In addition, each instruction may be instantiated with 128-bit, 256-bit, or 512-bit versions. It should also be noted that these instructions are presented here by way of example, not limitation.

Some embodiments of the proposed instructions focus on extracting 52 bits from a 64-bit data element or data lane. In a typical double precision (64-bit) floating point implementation, 1 bit is used for the sign, 8 bits are used for the exponent, and 52 bits are used for the mantissa. The ability to extract the lower 52 bits of a double precision floating point value allows applications to isolate and operate on just the mantissa. Of course, different desired results may be achieved by implementing slight variations of these instructions, such as extracting a different number of bits, or extracting the upper or middle bits instead of the lower bits. For instance, an instruction may be modified to extract a 23-bit mantissa instead of a 52-bit one, if the data type is single precision (32-bit) floating point value. In other words, embodiments of the present invention allow individual fields (e.g., sign, exponent, and mantissa) from packed data elements or data lanes that include multiple fields to be extracted and/or manipulated (e.g., concatenate, shift, and zero extend) via a single instruction, thereby increase efficiency.

vpshridq52z:

Embodiments of the vpshridq52z instruction may include the following forms:

vpshridq52z xmm1, xmm2, m64/m128 (src1, src2, src3/dst) (3 sources, 1 destination)
vpshridq52z ymm1, ymm2, m64/m256 (src1, src2, src3/dst) (3 sources, 1 destination)
vpshridq52z zmm1, zmm2, m64/m512 (src1, src2, src3/dst) (3 sources, 1 destination)

In operation, instruction vpshridq52z, when executed, cause performance of one or more operations to concatenate packed unsigned 52-bit integers in each 64-bit element of src1 and src2 to form a 104-bit intermediate result, shift the result to the right by a number of bits specified by a shift value/amount of src3, store the low 52 bits of the result in the destination, and store zeros in the high 12 bits of the destination (zero extend). One embodiment of the instruction vpshridq52zs may operate in accordance with the following code:

```
FOR j := 0 to (NBitLanes − 1)
    i := j*64
    tmp[103:0] := ((src1[i+51:i] << 52)[103:0] | src2[i+51:i])) >> src3[5:0]
    dst[i+63:0] = ZeroExtend64(tmp[51:0])
ENDFOR
``` vpshrvdq52z:

Embodiments of the vpshrvdq52z instruction may include the following forms:

vpshrvdq52z xmm1, xmm2, xmm3/m128 (src1, src2, src3/dst) (3 sources, 1 destination)
vpshrvdq52z ymm1, ymm2, ymm3/m256 (src1, src2, src3/dst) (3 sources, 1 destination)
vpshrvdq52z zmm1, zmm2, zmm3/m512 (src1, src2, src3/dst) (3 sources, 1 destination)

In operation, instruction vpshrvdq52z, when executed, cause performance of one or more operations to concatenate packed unsigned 52-bit integers in each 64-bit element of src1 and src2 to form a 104-bit intermediate result, shift the result to the right by a number of bits as specified by a corresponding shift value/amount of src3, store the low 52 bits of the result in the destination, and store zeros in the high 12 bits of the destination (zero extend). Instruction vpshrvdq52z differs from vpshridq52z in that the third operand src3 is a SIMD unit which stores a variable shift amount for each corresponding element position. One embodiment of the instruction vpshrvdq52z may operate in accordance with the following code:

```
FOR j := 0 to (NBitLanes − 1)
    i := j*64
    tmp[103:0] := ((src1[i+51:i] << 52)[103:0] | src2[i+51:i])) >>
    (src3[i+63:i] & 63)
    dst[i+63:0] = ZeroExtend64(tmp[51:0])
ENDFOR
``` vpshridq52:

Embodiments of the vpshridq52 instruction may include the following forms:

vpshridq52 xmm1, xmm2, xmm3/m128 (src1, src2, src3/dst) (3 sources, 1 destination)
vpshridq52 ymm1, ymm2, ymm3/m256 (src1, src2, src3/dst) (3 sources, 1 destination)
vpshridq52 zmm1, zmm2, zmm3/m512 (src1, src2, src3/dst) (3 sources, 1 destination)

In operation, instruction vpshridq52, when executed, cause performance of one or more operations to concatenate packed unsigned 52-bit integers in each 64-bit element of src1 and src2 to form a 104-bit intermediate result, shift the result to the right by a number of bits as specified by a shift value/amount of src3, and store the low 64 bits of the result in the destination. This instruction differs from vpshridq52z instruction in that the high 12 bits of the destination (e.g. bits 52-63) are not zeroed out but are rather kept from the shifted result. One embodiment of the instruction vpshrvdq52 may operate in accordance with the following code:

```
FOR j := 0 to (NBitLanes − 1)
    i := j*64
    tmp[103:0] := ((src1[i+51:i] << 52)[103:0] | src2[i+51:i])) >> src3[5:0]
    dst[i+63:0] = tmp[63:0]
ENDFOR
``` vpshrvdq52

Embodiments of the vpshrvdq52 instruction may include the following forms:

vpshrvdq52 xmm1, xmm2, xmm3/m128 (src1, src2, src3/dst) (3 sources, 1 destination)
vpshrvdq52 ymm1, ymm2, ymm3/m256 (src1, src2, src3/dst) (3 sources, 1 destination)
vpshrvdq52 zmm1, zmm2, zmm3/m512 (src1, src2, src3/dst) (3 sources, 1 destination)

In operation, instruction vpshrvdq52, when executed, cause performance of one or more operations to concatenate packed unsigned 52-bit integers in each 64-bit element of src1 and src2 to form a 104-bit intermediate result, shift the result to the right by a number of bits specified by a corresponding shift value/amount of src3, and store the low 64 bits of the result in the destination. This instruction differs from vpshridq52 in that the third operand src3 is a SIMD unit which stores a variable shift value/amount for each corresponding element position of src1 or src2. One embodiment of the instruction vpshrvdq52z may operate in accordance with the following code:

```
FOR j := 0 to (NBitLanes − 1)
    i := j*64
    tmp[103:0] := ((src1[i+51:i] << 52)[103:0] | src2[i+51:i])) >>
    (src3[i+63:i] & 63)
    dst[i+63:0] = tmp[63:0]
ENDFOR
``` vpshlidq52z:

Embodiments of the vpshlidq52z instruction may include the following forms:

vpshlidq52z xmm1, zmm2, m64/m128 (src1, src2, src3/dst) (3 sources, 1 destination)

vpshlidq52z ymm1, ymm2, m64/m256 (src1, src2, src3/dst) (3 sources, 1 destination)

vpshlidq52z zmm1, zmm2, m64/m512 (src1, src2, src3/dst) (3 sources, 1 destination)

In operation, instruction vpshlidq52z, when executed, cause performance of one or more operations to concatenate packed unsigned 52-bit integers in each 64-bit element of src1 and src2 to form a 104-bit intermediate result, shift the result to the left by a number of bits as specified by a shift value/amount of src3, store the high 52 bits of the result in the destination, and store zeros in the high 12 bits of the destination (zero extend). This instruction differs from vpshridq52z in that the intermediate result is shifted to the left instead of right, and that the high 52 bits of the shifted intermediate result are stored to the destination instead of the low 52 bits. One embodiment of the instruction vpshrlidq52z may operate in accordance with the following code:

```
FOR j := 0 to (NBitLanes – 1)
    i := j*64
    tmp[103:0] := ((src1[i+51:i] << 52)[103:0] | src2[i+51:i])) << src3[5:0]
    dst[i+63:0] = ZeroExtend64(tmp[103:52])
ENDFOR
``` vpshlvdq52z:

Embodiments of the vpshlvdq52z instruction may include the following forms:

vpshlvdq52z xmm1, xmm2, xmm3/m128 (src1, src2, src3/dst) (3 sources, 1 destination)

vpshlvdq52z ymm1, ymm2, ymm3/m256 (src1, src2, src3/dst) (3 sources, 1 destination)

vpshlvdq52z zmm1, zmm2, zmm3/m512 (src1, src2, src3/dst) (3 sources, 1 destination)

In operation, instruction vpshlvdq52z, when executed, cause performance of one or more operations to concatenate packed unsigned 52-bit integers in each 64-bit element of src1 and src2 to form a 104-bit intermediate result, shift the result to the left by a number of bits as specified by a corresponding shift value/amount of src3, store the high 52 bits of the result in the destination, and store 0 in the high 12 bits of the destination (zero extend). Instruction vpshlvdq52z differs from vpshlidq52z in that the third operand src3 is a SIMD unit which stores a variable shift amount for each corresponding element position of src1 or src2. One embodiment of the instruction vpshlvdq52z may operate in accordance with the following code:

```
FOR j := 0 to (NBitLanes – 1)
    i := j*64
    tmp[103:0] := ((src1[i+51:i] << 52)[103:0] | src2[i+51:i])) <<
    (src3[i+63:i] & 63)
    dst[i+63:0] = ZeroExtend64(tmp[103:52])
ENDFOR
``` vpshlidq52:

Embodiments of the vpshlidq52 instruction may include the following forms:

vpshlidq52 xmm1, xmm2, xmm3/m128 (src1, src2, src3/dst) (3 sources, 1 destination)

vpshlidq52 ymm1, ymm2, ymm3/m256 (src1, src2, src3/dst) (3 sources, 1 destination)

vpshlidq52 zmm1, zmm2, zmm3/m512 (src1, src2, src3/dst) (3 sources, 1 destination)

In operation, instruction vpshlidq52, when executed, cause performance of one or more operations to concatenate packed unsigned 52-bit integers in each 64-bit element of src1 and src2 to form a 104-bit intermediate result, shift the result to the left by a number of bits specified by a shift value/amount of src3, and store the high 64 bits of the result in the destination. This instruction differs from vpshlidq52z instruction in that the high 12 bits of the destination (e.g. bits 52-63) are not zeroed out but are rather kept from the shifted result. One embodiment of the instruction vpshlvdq52 may operate in accordance with the following code:

```
FOR j := 0 to (NBitLanes – 1)
    i := j*64
    tmp[103:0] := ((src1[i+51:i] << 52)[103:0] | src2[i+51:i])) << src3[5:0]
    dst[i+63:0] = tmp[103:40];
ENDFOR.
```

Embodiments of the vpshlvdq52 instruction may include the following forms:

vpshlvdq52 xmm1, xmm2, xmm3/m128 (src1, src2, src3/dst) (3 sources, 1 destination)

vpshlvdq52 ymm1, ymm2, ymm3/m256 (src1, src2, src3/dst) (3 sources, 1 destination)

vpshlvdq52 zmm1, zmm2, zmm3/m512 (src1, src2, src3/dst) (3 sources, 1 destination)

In operation, instruction vpshlvdq52, when executed, cause performance of one or more operations to concatenate packed unsigned 52-bit integers in each 64-bit element of src1 and src2 to form a 104-bit intermediate result, shift the result left by the amount specified by a corresponding shift value/amount of src3, and store the high 64 bits of the result in the destination. This instruction differs from vpshlidq52 in that the third operand src3 is a SIMD unit which stores a variable shift value/amount for each corresponding element position of src1 or src2. One embodiment of the instruction vpshlvdq52z may operate in accordance with the following code:

```
FOR j := 0 to (NBitLanes – 1)
    i := j*64
    tmp[103:0] := ((src1[i+51:i] << 52)[103:0] | src2[i+51:i])) <<
    (src3[i+63:i] & 63)
    dst[i+63:0] = tmp[103:40]
ENDFOR
```

Optionally, each of the instructions described herein may implemented with a mask for specifying the data lanes to operate on. For example, the mask may be an 8-bit mask where each bit corresponds to a data lane. If the mask bit is not set for a given lane, then the data element in that lane may simply be copied to the destination without any operations performed thereon, or the existing value in the corresponding lane of the destination may be left as is. In some embodiments, the mask itself or its storage location (e.g., a mask register) is provided as an operand of the instruction. Alternatively, the mask may be stored in a specific, predetermined location (e.g., a mask register) associated with the instruction. In one embodiment, the mask is implemented as a zero-mask in that if the mask bit is not set for a given lane, the corresponding destination element is zeroed out rather than copied from one of the source operands (i.e. src1 or src2).

In some embodiments, an instruction allowing for variable bit-width concatenation is implemented. While the instructions described above focus on concatenating the lower 52 bits of two source operands, the underlying principles of the invention are not limited to any particular bit amount. Rather, depending on the desired implementation, any number of bits from two source operands may be concatenated and still comply with the underlying principles of the invention. Furthermore, one embodiment of the instruction even allows the number of bits to be selected from each operand be specified via an additional operand of the instruction. For instance, an instruction may be implemented to include a fourth operand (e.g., an 8-bit source operand src4) for specifying the number of bits to be selected from each operand for concatenation. According to the embodiment, the instruction may use "v" instead of "52" in the naming convention to indicate that the number of bits selected from each operand may vary. One specific embodiment of the instruction vpshridqv may include the following forms:

vpshridqvz xmm1, xmm2, m64, imm8/m128 (src1, src2, src3, src4/dst) (4 sources, 1 destination)
vpshridqvz ymm1, ymm2, m64, imm8/m256 (src1, src2, src3, src4/dst) (4 sources, 1 destination)
vpshridqvz zmm1, zmm2, m64, imm8/m512 (src1, src2, src3, src4/dst) (4 sources, 1 destination)

In operation, instruction vpshridqvz, when executed, causes performance of one or more operations to concatenate packed unsigned N-bit integers in each 64-bit element of src1 and src2 to form a 2*N-bit intermediate result, where N is specified by src4, shift the result right by a number of bits specified by a corresponding shift value/amount of src3, store the low N bits of the shifted result in the destination, and optionally set the top (64−N) bits to 0. One embodiment of the instruction vpshridqvz may operate in accordance with the following code:

```
FOR j := 0 to (NBitLanes − 1)
    i := j*64
    k := src4[5:0]
    tmp[2*k-1:0] := ((src1[i+k-1:i] << k)[2*k-1:0] | src2[i+k-1:i])) >> (src3[i+63:i] & 63)
    dst[i+63:0] = ZeroExtend(tmp[k:0])
ENDFOR
```

Of course, the variable bit-width embodiment may also be implemented with a mask as described above. Moreover, according to some embodiments, each operation (concatenation, shift, etc.) may be performed both out-of-place as presented so far, or in-place in which case the concatenated shifted result overwrites one of the input operands src1 or src2 instead of the destination.

Figure 6:
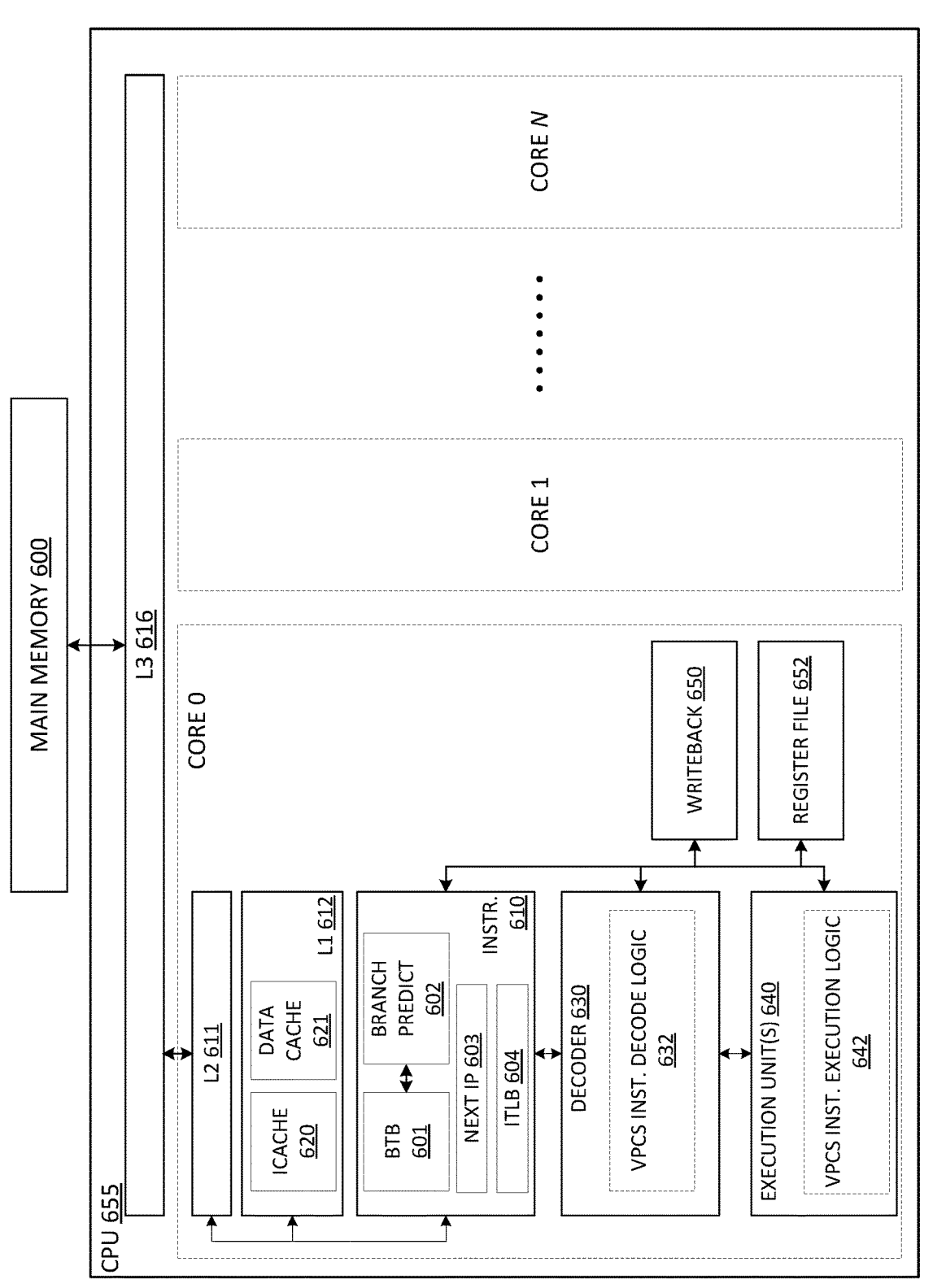
FIG. 6 illustrates an exemplary processor on which embodiments of the invention may be implemented.

FIG. 6 illustrates an exemplary processor on which embodiments of the instructions disclosed herein may be implemented. CPU 655 may include one or more processor cores. The details of a single processor core ("Core 0") are illustrated in FIG. 6 for simplicity. It will be understood, however, that each core shown in FIG. 6 may have the same or similar set of components as Core 0. For example, each core may include dedicated Level 1 (L1) cache 612 and Level 2 (L2) cache 611 for caching instructions and data according to a specified cache management policy. The L1 cache 612 may additionally include an instruction cache 620 for storing instructions and a data cache 621 for storing data. The instructions and data stored within the various processor caches are managed at the granularity of cache lines which may be a fixed size (e.g., 64, 128, 512 Bytes in length). Data may be stored temporarily in register file 652 during the execution of instructions. Register file 652 may include general purpose registers (GPRs), vector registers, mask registers, etc. Each processor core further includes an instruction fetch unit 610 for fetching instructions from main memory 600 and/or a shared Level 3 (L3) cache 616; a decoder or decode unit 630 for decoding the instructions (e.g., decoding program instructions into micro-operations or "uops"); an execution unit 640 for executing the instructions; and a writeback unit 650 for retiring instructions and writing back results.

The instruction fetch unit 610 may include various well known components including a next instruction pointer 603 for storing the address of the next instruction to be fetched from memory 600 (or one of the caches); an instruction translation look-aside buffer (ITLB) 604 for storing a map of recently used virtual-to-physical instruction addresses to improve the speed of address translation; a branch prediction unit 602 for speculatively predicting instruction branch addresses; and branch target buffers (BTBs) 601 for storing branch addresses and target addresses. Once fetched, instructions are streamed to the remaining stages of the instruction pipeline including the decode unit 630, the execution unit 640, and the writeback unit 650. The structure and function of each of these units is well understood by those of ordinary skill in the art and will not be described here in detail to avoid obscuring the pertinent aspects of the different embodiments of the invention.

In one embodiment, the decode unit 630 includes a vector packed concatenate and shift (VPCS) instruction decoder 631 for decoding the new set of VPCS instructions described above (e.g., vpshridq52z, vpshrvdq52z, etc.) and the execution unit 640 includes a vector packed concatenate and shift (VPCS) instruction execution unit 641 for executing the decoded VPCS instructions.

Figure 7:
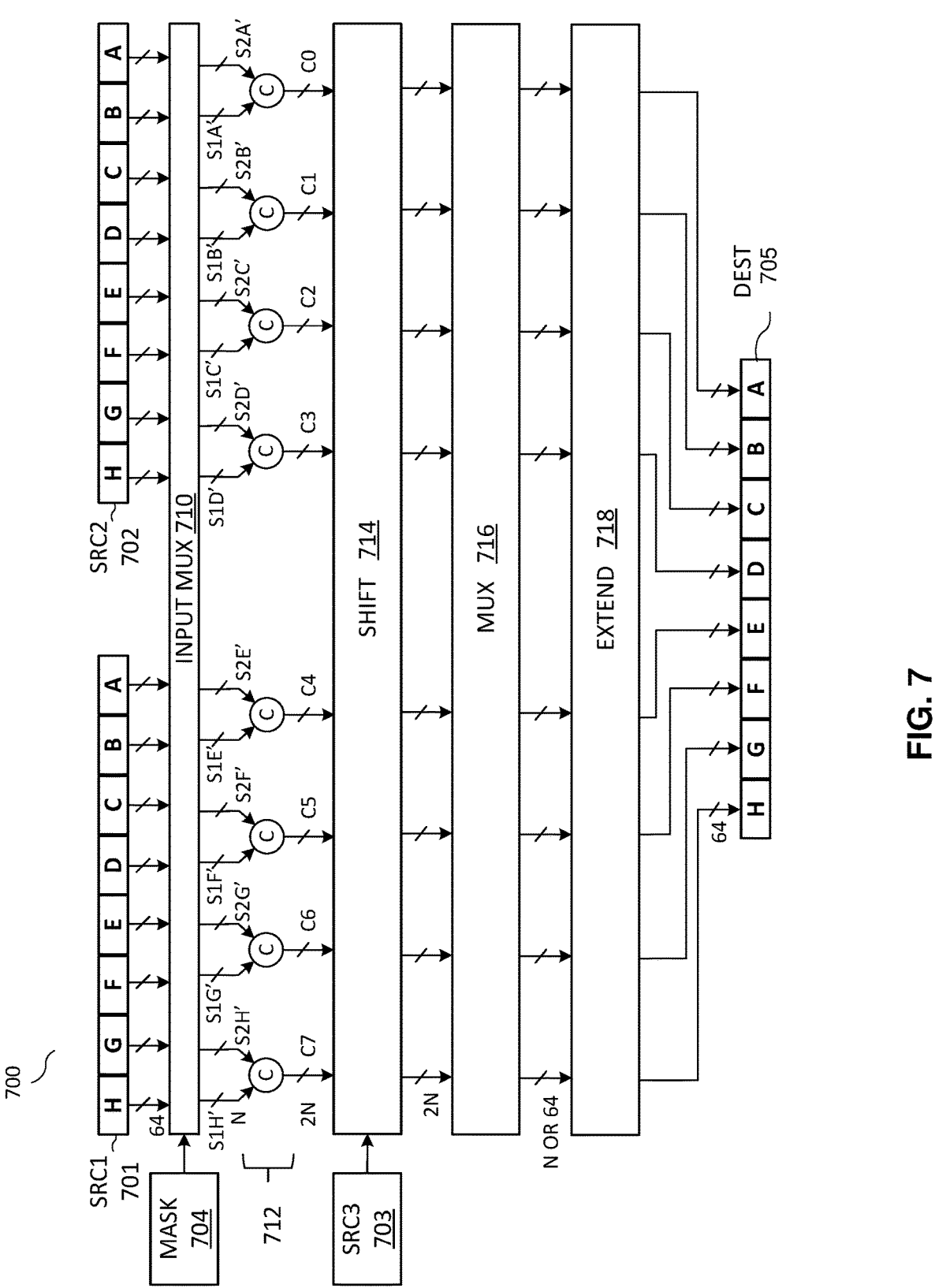
FIG. 7 illustrates an exemplary execution unit on which embodiments of the invention may be implemented.

FIG. 7 illustrates the logic/circuitry for executing vector packed shift instructions according to an embodiment. The logic/circuitry 700 may be part of execution unit 640 of FIG. 6. Specifically, logic/circuitry 700 may be implemented as part of logic 642 for executing the vector packed concatenate and shift instructions. As illustrated, an input multiplexer (mux) 710 selects inputs from sources src1 701 and src2 702 which may be registers or memory locations. Each of the sources src1 701 and src2 702 may include data elements or lanes A-H. While 8 data elements (i.e. A-H) are illustrated, one skilled in the arts will appreciate that more or less data elements may be implemented. For example, src1 and src2 may be 512-bit registers each containing eight 64-bit data elements A-H. Alternatively, src1 and src2 may be 256-bit registers each containing four 64 bit data elements A-D or 128-bit registers each containing two 64-bit data elements A-B. Other embodiments may also include data elements of other bit sizes (e.g., 16, 32, etc.).

In one embodiment, the input mux 710 is capable of selecting any number of bits from each of the data elements A-H. For example, the input mux 710 may select N bits from each of the data elements A-H of src1 and N bits from each data elements A-H of src2. N may be equal to or less than the bit size of the data elements. For example, in one embodiment, the bit size of each data element is 64 and N is 52. The bits selected from each of the data elements A-H may be consecutive upper N bits or consecutive lower N bits, depending on the implementation. In particular, the selected N bits may be associated with one of many fields in a data element. Thus, by selecting different N bits (e.g., upper, lower, or middle consecutive N bits), the input mux 710 is effectively selecting specific fields from each data element A-H.

In one embodiment, a mask 704 is applied to the input mux 710 to indicate whether bits are to be selected from each of the data elements A-H. For instance, the mask 704 may include a plurality of bits each corresponding to one of the data element positions A-H. If a mask bit corresponding to a data element position is set, then N bits are selected from the corresponding data element position. If the mask bit is not set, then no bits are selected from the corresponding data element position.

Next, the bits selected by the mux 710 are concatenated by one or more concatenators 712 to generate a plurality of concatenated results (e.g., bits strings). For example, N selected bits from data element A of src1 (denoted S1A') is concatenated with N selected bits from data element A of src2 (denoted S2A') to generate a concatenated result C0 of size 2*N. A shift logic/circuitry 714 performs left and/or right bit shift on each of the concatenated results C0-C7 to generate shifted results (bit strings). The number of bits to shift is specified by a shift value/amount provided by src3 703. For instance, src3 may be an immediate operand of the instruction. Alternatively, src3 may be a register or memory location storing one or more shift amounts. Src3 may include a single shift amount to be applied on all of the concatenated results C0-C7, or multiple shift amounts each corresponding to one of the concatenated results or data element positions. A mux 716 is used to select a portion of the bits from each of the shifted results. In one embodiment, N consecutive bits are selected from each of the shifted results. In another embodiment, the number of bits selected is equal to the bit size of the data element or data lane. If the number of bits selected (i.e. N) is less than the width of the data elements in the destination 705 (e.g., 64 bits), according to an embodiment, the extension circuitry 718 may optionally extend the selected bits to the data element width. For example, zeros may be added to the upper portion of the N selected bits to extend it to the width of the data element position (e.g., 64 bits) in the destination. The extended bits are then stored into a corresponding data element position of the destination 705. If the number of bits selected from each shifted result is already equal to the size of the data element position of the destination 705, then no extension of the bits is necessary.

Figure 8:
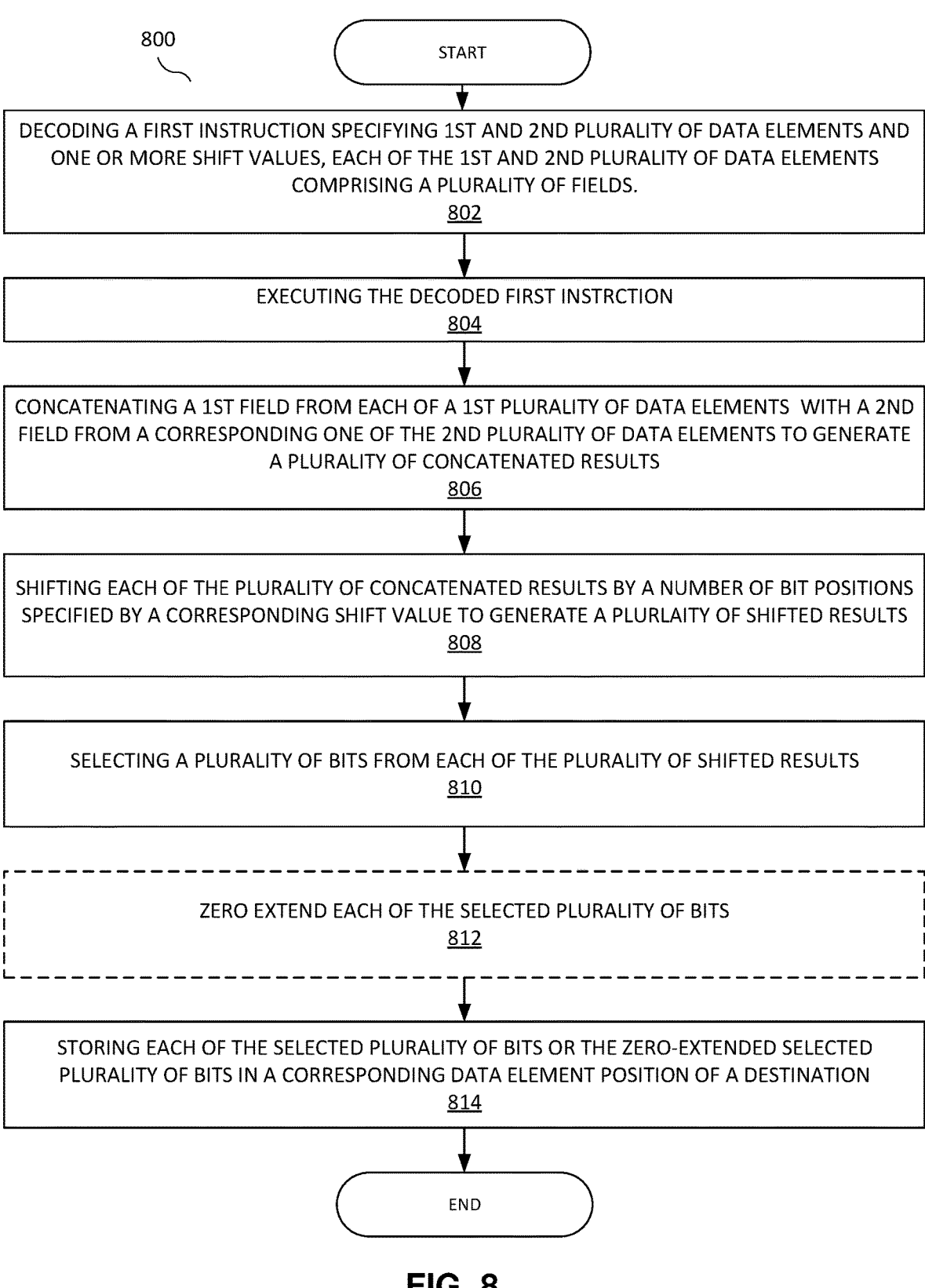
FIG. 8 illustrates the operations associated with executing a vector packed concatenate and shift instruction according to an embodiment.

One embodiment of a method implemented in response to the vector packed concatenate and shift instruction is illustrated in FIG. 8. Method 800 may be executed on the architectures described above but is not limited to any particular processor architecture.

At 802, a first instruction is decoded. The first instruction may include fields for specifying source operands src1, src2, and src3, which may be registers or memory locations. The decoding may be performed by decoder logic or circuitry, such as logic 632 of decoder 630 of FIG. 6. At 804, the decoded first instruction is executed by an execution logic or circuitry, such as logic 642 of execution unit 640. Responsive to executing the first instruction, a first plurality of bits from each of the first plurality of data elements of src1 is concatenated with a second plurality of bits from each of the second plurality of data elements of src2 to generate a plurality of concatenated results (bit strings) at reference 806. For example, N bits from each of one or more data element of src1 is concatenated with N bits from a corresponding data element of src2 to generate a concatenated result of size 2*N for each pair of data elements between src1 and src2. In one embodiment, N is chosen based on the length of a particular field within each data element. As noted above, in double precision floating point data types, N may be 52, or the size of the mantissa. In particular, N may be specified via an additional operand of the first instruction or otherwise identified by an opcode associated with the first instruction.

At 808, each of the concatenated results is shifted by a number of bit positions specified by a corresponding shift amount of src3 to generate a shifted result (bit string). The direction of the shift, according to an embodiment, is specified by the opcode associated with the first instruction. Alternatively, the direction of the shift may be specified by another operand of the first instruction.

At 810, a plurality of bits is selected from each of shifted results. Optionally at 812, the selected bits from each shifted result are zero-extended. At 814, the selected bits from each shifted result, or their zero-extended versions, are stored into a corresponding data element position of a destination.

Figure 9:
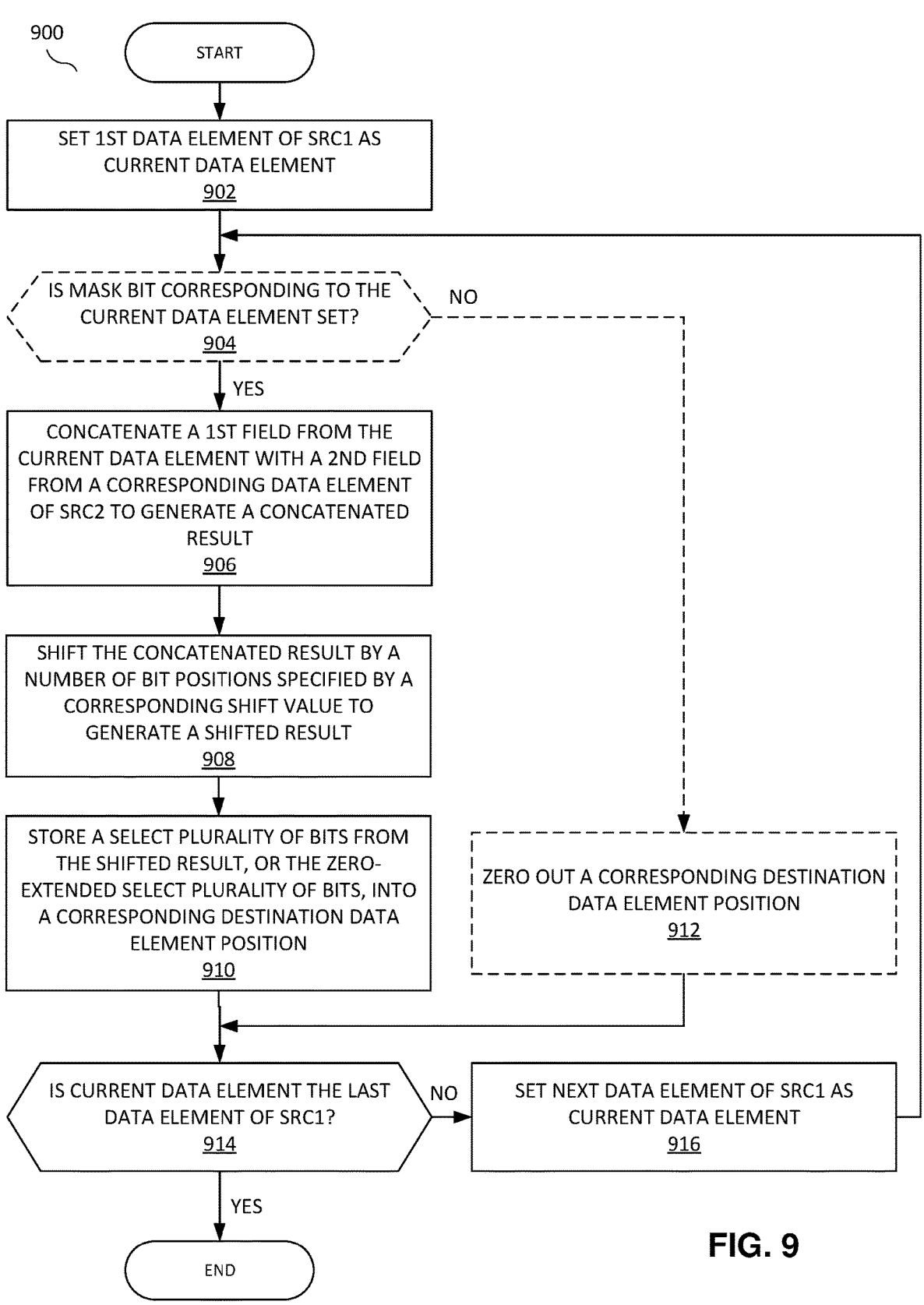
FIG. 9 illustrates the operations associated with executing a vector packed concatenate and shift instruction in accordance with another embodiment.

FIG. 9 illustrates another embodiment of a method implemented in response to the vector packed concatenate and shift instruction. Method 900 may be executed on the architectures described above but is not limited to any particular processor architecture.

At 902, a first data element of a first source src1 is set as the current data element. The first source may be a register or a memory location. At 904, a determination is made on whether a mask bit corresponding the first data element is set. If the mask bit is not set, then a destination data element corresponding to the first data element is zeroed out at 912. If the mask bit is set, then method 900 proceeds to 906. As indicated by the dashed boxes at 904 and 912, the implementation of the mask is optional.

At 906, a first plurality of bits (N bits) of the first data element is concatenated with a second plurality of bits (N bits) of a corresponding data element of a second source src2 to generate a concatenated result (or bit string) of 2*N bits. At 908, the concatenated result is left or right shifted by a number of bit positions specified by a corresponding shift amount or shift value to generate a shifted result (or bit string). At 910, a third plurality of bits in the shifted result is selected and stored to a corresponding destination data element position. The number of bit selected may be equal to or less than the size of the destination data element position. In one embodiment, the selected third plurality of bits are zero-extended prior to being stored into the destination data element position. At 914, if the current data element is the last data element of the first source, then method 900 concludes. Otherwise, at 916, the next data element of the first source src1 is set as the current data element and method 900 returns to 904.

FIG. 10 illustrate a comparison of two implementations of element-wise modular multiplication according to an embodiment. The current implantation 1010 shown at the top requires 11 assembly instructions. In contrast, implementation 1020 shown at the bottom takes advantage of the new vector packed concatenate and shift instruction needs only 9 assembly instructions. This is achieved by replacing the 3-instruction sequence 1024 with a single call to the "_mm512_shiridi52_epi64" instruction 1022 in the computation of c1. The table in FIG. 11 illustrates the performance improvements associated with conducting element-wise modular multiplication using the new ISA, which resulted in an 1.09-1.11× speedup over using the existing ISA.

EXAMPLES

The following are example implementations of different embodiments of the invention.

Example 1. An apparatus that includes: a first source register to store a first plurality of data elements; a second source register to store a second plurality of data elements; a third source register to store one or more shift values; decoder circuitry to decode a first instruction specifying the first, second, and third source registers, wherein the first and second plurality of data elements in the first and second source registers each includes a plurality of fields; and execution circuitry to execute the decoded first instruction. The execution circuitry includes concatenation circuitry to concatenate a first field from each of the first plurality of data elements with a second field from a corresponding data element of the second plurality of data elements to generate a plurality of concatenated results. The execution circuitry further includes shift circuitry to shift each of the plurality of concatenated results by a number of bit positions specified by a corresponding one of the one or more shift values to generate a plurality of shifted results, wherein a select plurality of bits from each of the plurality of shifted results is stored in a corresponding data element position of a destination register.

Example 2. The apparatus of Example 1, wherein the first and second plurality of data elements are quadword data elements.

Example 3. The apparatus of Example 1, wherein each of the first and second fields includes N consecutive bits.

Example 4. The apparatus of Example 3, wherein N is specified by the first instruction or identified by an opcode associated with the first instruction.

Example 5. The apparatus of Example 3, wherein N is less than a number of bits in the data element of the first and second plurality of data elements.

Example 6. The apparatus of Example 3, wherein N is 52.

Example 7. The apparatus of Example 3 further includes a temporary register of 2*N bits to store one of the plurality of concatenated results or shifted results.

Example 8. The apparatus of Example 3, wherein the first instruction or an opcode associated with the first instruction is to specify a direction of the shift as either left or right.

Example 9. The apparatus of Example 8, wherein the select plurality of bits includes lower consecutive M bits of a corresponding shifted result when the shift is a right shift and includes upper consecutive M bits of the corresponding shifted result when the shift is a left shift.

Example 10. The apparatus of Example 9, wherein M is equal to a number of bits in each data element of the first and second plurality of data elements.

Example 11. The apparatus of Example 9 further includes extension circuitry to zero extend the select plurality of bits from M bits to the number of bits in the data element of the first and second plurality of data elements prior to storing the third plurality of bits in the destination register.

Example 12. The apparatus of Example 1 further includes a mask register to store a mask to identify the first and second plurality of data elements from the first and second source registers.

Example 13. The apparatus of Example 1, wherein shift circuitry is to shift each of the plurality of concatenated results by a number of bit positions specified by a same shift value to generate the plurality of shifted results.

Example 14. The apparatus of Example 1, wherein the destination register is a same register for storing the first or the second plurality of data elements.

Example 15. A method that includes decoding a first instruction specifying a first source register storing a first plurality of data elements, a second source register storing a second plurality of data elements, and a third register storing one or more shift values, wherein the first and second plurality of data elements in the first and second source registers each includes a plurality of fields; executing the decoded first instruction; concatenating a first field from each of the first plurality of data elements with a second field from a corresponding data element of the second plurality of data elements to generate a plurality of concatenated results; shifting each of the plurality of concatenated results by a number of bit positions specified by a corresponding one of the one or more shift values to generate a plurality of shifted results; and storing a select plurality of bits from each of the plurality of shifted results in a corresponding data element position of a destination register.

Example 16. The method of Example 15, wherein the first and second plurality of data elements are quadword data elements.

Example 17. The method of Example 15, wherein each of the first and second fields comprises N consecutive bits.

Example 18. The method of Example 17, wherein N is specified by the first instruction or identified by an opcode associated with the first instruction.

Example 19. The method of Example 17, wherein N is less than a number of bits in the data element of the first and second plurality of data elements.

Example 20. The method of Example 17, wherein N is 52.

Example 21. The method of Example 17 further includes storing one of the plurality of concatenated results or shifted results in a temporary register of 2*N bits.

Example 22. The method of Example 17, wherein the first instruction or an opcode associated with the first instruction is to specify a direction of the shift as either left or right.

Example 23. The method of Example 22, wherein the select plurality of bits includes lower consecutive M bits of a corresponding shifted result when the shift is a right shift and includes upper consecutive M bits of the corresponding shifted result when the shift is a left shift.

Example 24. The method of Example 23, wherein M is equal to a number of bits in each data element of the first and second plurality of data elements.

Example 25. The method of Example 23 further includes zero extending the select plurality of bits from M bits to the number of bits in the data element of the first and second plurality of data elements prior to storing the select plurality of bits in the destination register.

Example 26. The method of Example 15 further includes using a mask stored in a mask register to identify the first and second plurality of data elements in the first and second registers.

Example 27. The method of Example 15 further includes shifting each of the plurality of concatenated results by a number of bit positions specified by a same shift value to generate the plurality of shifted results.

Example 28. The method of Example 15, wherein the destination register is a same register for storing the first and second plurality of data elements.

Example 29. A non-transitory machine-readable medium having program code stored thereon which, when executed by a machine, causes the machine to perform operations of: decoding a first instruction specifying a first source register storing a first plurality of data elements, a second source register storing a second plurality of data elements, and a third source register storing one or more shift values, wherein the first and second plurality of data elements in the first and second source registers each comprises a plurality of fields; executing the decoded first instruction; concatenating a first field from each of a first plurality of data elements with a second field from a corresponding data element of a second plurality of data elements to generate a plurality of concatenated results; shifting each of the plurality of concatenated results by a number of bit positions specified by a corresponding one of one or more shift values to generate a plurality of shifted results; and storing a select plurality of bits from each of the plurality of shifted results in a corresponding data element position of a destination register.

Example 30. The non-transitory machine-readable medium of Example 29, wherein the first and second plurality of data elements are quadword data elements.

Example 31. The non-transitory machine-readable medium of Example 29, wherein each of the first and second fields includes N consecutive bits.

Example 32. The non-transitory machine-readable medium of Example 31, wherein N is specified by the first instruction or identified by an opcode associated with the first instruction.

Example 33. The non-transitory machine-readable medium of Example 31, wherein N is less than a number of bits in the data element of the first and second plurality of data elements.

Example 34. The non-transitory machine-readable medium of Example 31, wherein N is 52.

Example 35. The non-transitory machine-readable medium of Example 31, wherein the operations further include storing one of the plurality of concatenated results or shifted results in a temporary register of 2*N bits.

Example 36. The non-transitory machine-readable medium of Example 31, wherein the first instruction or an opcode associated with the first instruction is to specify a direction of the shift as either left or right.

Example 37. The non-transitory machine-readable medium of Example 36, wherein the select plurality of bits includes lower consecutive M bits of a corresponding shifted result when the shift is a right shift and includes upper consecutive M bits of the corresponding shifted result when the shift is a left shift.

Example 38. The non-transitory machine-readable medium of Example 37, wherein M is equal to a number of bits in each data element of the first and second plurality of data elements.

Example 39. The non-transitory machine-readable medium of Example 37, wherein the operations further include zero extending the number of bits in each select plurality of bits from M bits to the number of bits in the data element of the first and second plurality of data elements prior to storing the select plurality of bits in the destination register.

Example 40. The non-transitory machine-readable medium of Example 29, wherein the operations further include using a mask stored in a mask register to identify the first and second plurality of data elements in the first and second registers.

Example 41. The non-transitory machine-readable medium of Example 29, wherein the operations further include shifting each of the plurality of concatenated results by a same shift value to generate the plurality of shifted results.

Example 42. The non-transitory machine-readable medium of Example 29, wherein the destination register is a same register for storing the first or the second plurality of data elements.

Exemplary Processor Architectures and Data Types

Figures 12A, 12B:
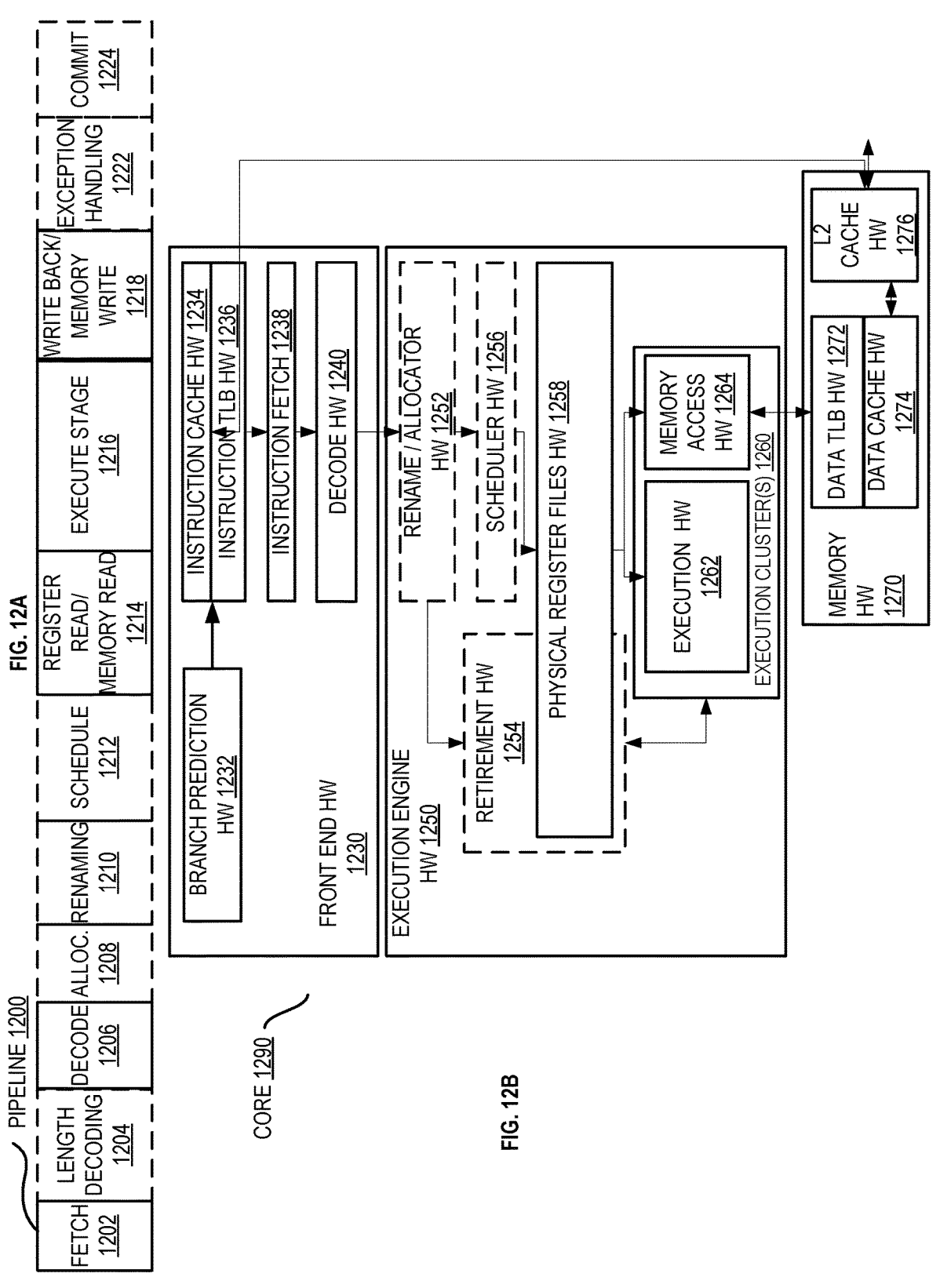
FIG. 12A is a block diagram illustrating both an exemplary in-order pipeline and an exemplary register renaming, out-of-order issue/execution pipeline according to embodiments of the invention.
FIG. 12B is a block diagram illustrating both an exemplary embodiment of an in-order architecture core and an exemplary register renaming, out-of-order issue/execution architecture core to be included in a processor according to embodiments of the invention.

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end hardware 1230 coupled to an execution engine hardware 1250, and both are coupled to a memory hardware 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end hardware 1230 includes a branch prediction hardware 1232 coupled to an instruction cache hardware 1234, which is coupled to an instruction translation lookaside buffer (TLB) 1236, which is coupled to an instruction fetch hardware 1238, which is coupled to a decode hardware 1240. The decode hardware 1240 (or decoder) may decode instructions, and generate as an output one or more microoperations, micro-code entry points, microinstructions, other instructions, or other control signals, which are decoded from, or which otherwise reflect, or are derived from, the original instructions. The decode hardware 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode hardware 1240 or otherwise within the front end hardware 1230). The decode hardware 1240 is coupled to a rename/allocator hardware 1252 in the execution engine hardware 1250.

The execution engine hardware 1250 includes the rename/allocator hardware 1252 coupled to a retirement hardware 1254 and a set of one or more scheduler hardware 1256. The scheduler hardware 1256 represents any number of different schedulers, including reservations stations, central instruction window, etc. The scheduler hardware 1256 is coupled to the physical register file(s) hardware 1258. Each of the physical register file(s) hardware 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1258 comprises a vector registers hardware, a write mask registers hardware, and a scalar registers hardware. This register hardware may provide architectural vector registers, vector mask registers, and general purpose registers. The physical register file(s) hardware 1258 is overlapped by the retirement hardware 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1254 and the physical register file(s) hardware 1258 are coupled to the execution cluster(s) 1260. The execution cluster(s) 1260 includes a set of one or more execution hardware 1262 and a set of one or more memory access hardware 1264. The execution hardware 1262 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1256, physical register file(s) hardware 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1264). It should also be understood that where separate pipelines are used, one or more of these pipelines may be out-of-order issue/execution and the rest in-order.

The set of memory access hardware 1264 is coupled to the memory hardware 1270, which includes a data TLB hardware 1272 coupled to a data cache hardware 1274 coupled to a level 2 (L2) cache hardware 1276. In one exemplary embodiment, the memory access hardware 1264 may include a load hardware, a store address hardware, and a store data hardware, each of which is coupled to the data TLB hardware 1272 in the memory hardware 1270. The instruction cache hardware 1234 is further coupled to a level 2 (L2) cache hardware 1276 in the memory hardware 1270. The L2 cache hardware 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode hardware 1240 performs the decode stage 1206; 3) the rename/allocator hardware 1252 performs the allocation stage 1208 and renaming stage 1210; 4) the scheduler hardware 1256 performs the schedule stage 1212; 5) the physical register file(s) hardware 1258 and the memory hardware 1270 perform the register read/memory read stage 1214; the execution cluster 1260 perform the execute stage 1216; 6) the memory hardware 1270 and the physical register file(s) hardware 1258 perform the write back/memory write stage 1218; 7) various hardware may be involved in the exception handling stage 1222; and 8) the retirement hardware 1254 and the physical register file(s) hardware 1258 perform the commit stage 1224.

The core 1290 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1290 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1234/1274 and a shared L2 cache hardware 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13:
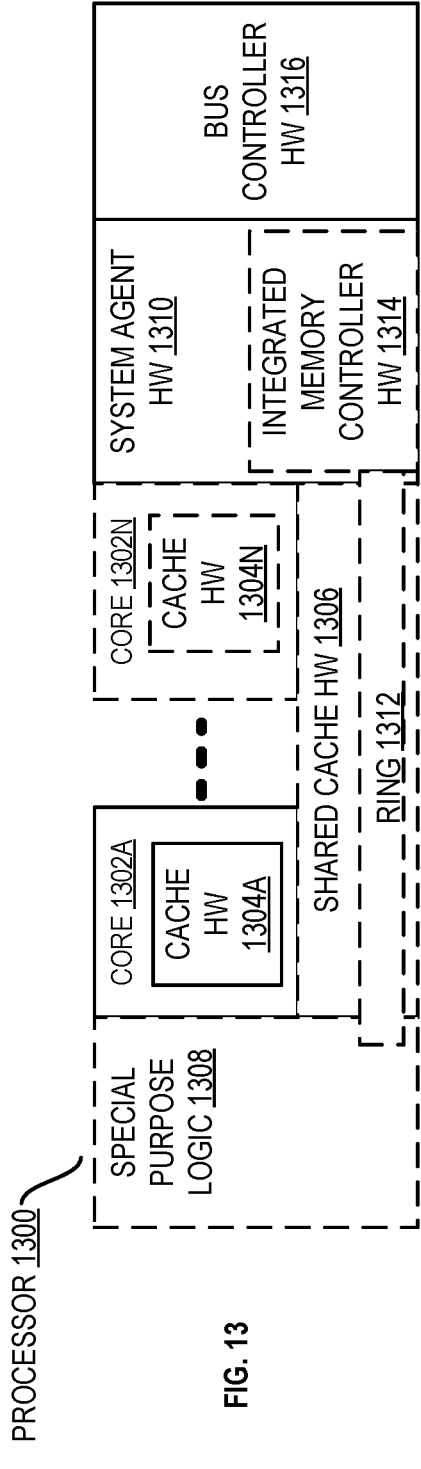
FIG. 13 is a block diagram of a single core processor and a multicore processor with integrated memory controller and graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller hardware 1316, while the optional addition of the dashed lined boxes illustrates an alternative processor 1300 with multiple cores 1302A-N, a set of one or more integrated memory controller hardware 1314 in the system agent hardware 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1306, and external memory (not shown) coupled to the set of integrated memory controller hardware 1314. The set of shared cache hardware 1306 may include one or more mid-level caches, such as level 2 (L2), level 3 (L3), level 4 (L4), or other levels of cache, a last level cache (LLC), and/or combinations thereof. While in one embodiment a ring based interconnect hardware 1312 interconnects the integrated graphics logic 1308, the set of shared cache hardware 1306, and the system agent hardware 1310/integrated memory controller hardware 1314, alternative embodiments may use any number of well-known techniques for interconnecting such hardware. In one embodiment, coherency is maintained between one or more cache hardware 1306 and cores 1302-A-N.

In some embodiments, one or more of the cores 1302A-N are capable of multi-threading. The system agent 1310 includes those components coordinating and operating cores 1302A-N. The system agent hardware 1310 may include for example a power control unit (PCU) and a display hardware. The PCU may be or include logic and components needed for regulating the power state of the cores 1302A-N and the integrated graphics logic 1308. The display hardware is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set. In one embodiment, the cores 1302A-N are heterogeneous and include both the "small" cores and "big" cores described below.

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
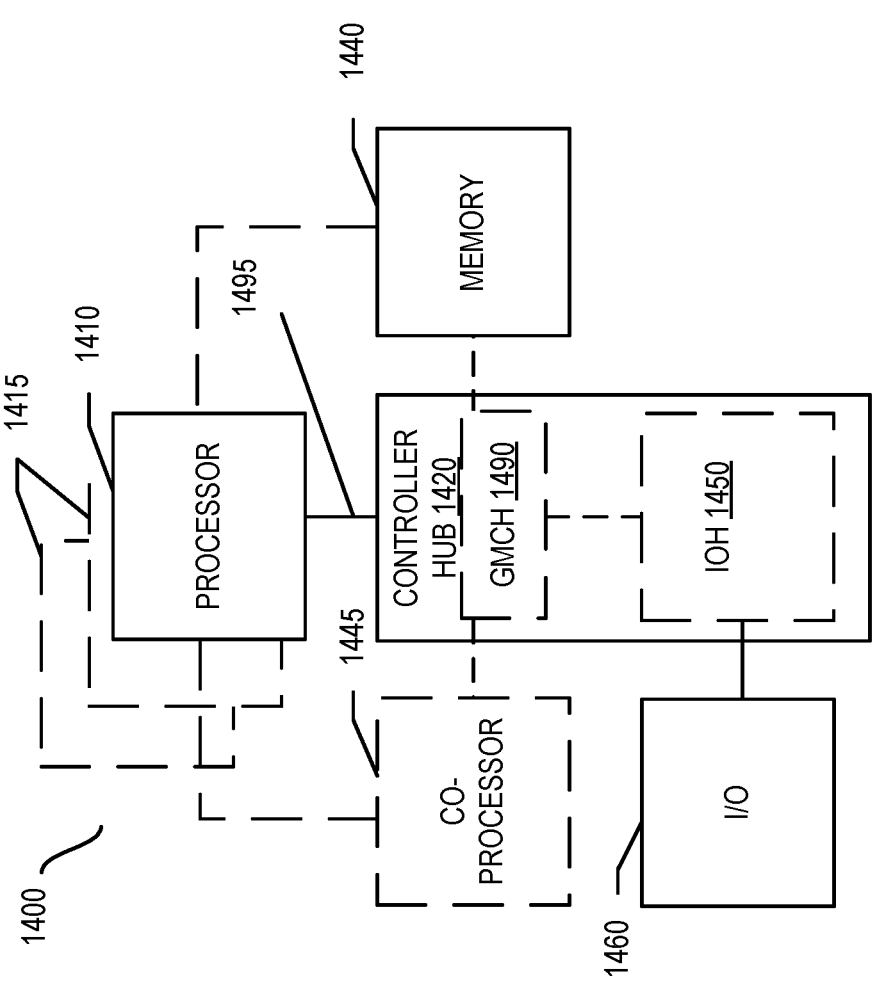
FIG. 14 illustrates a block diagram of a system in accordance with one embodiment of the present invention.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410,

1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface, or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
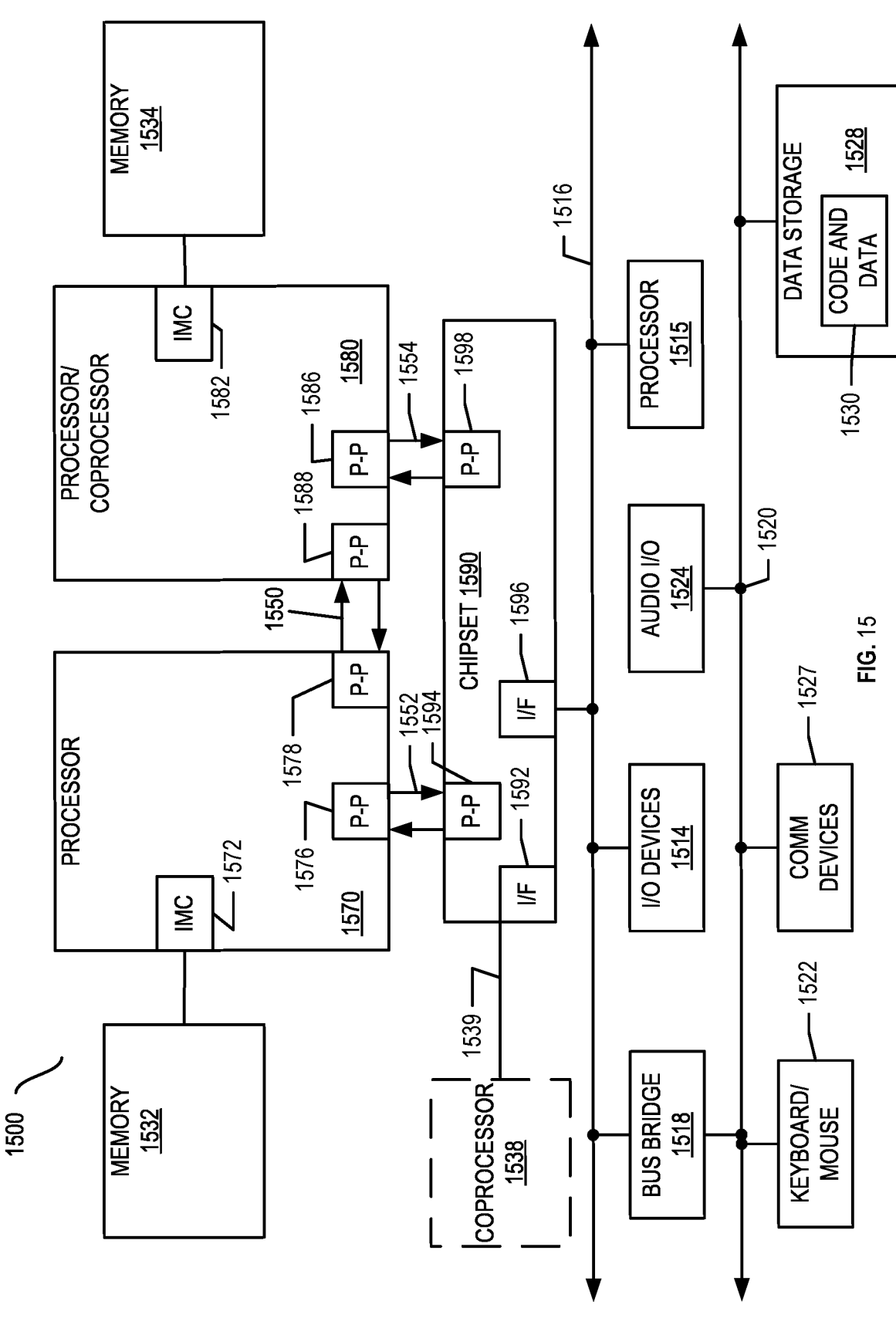
FIG. 15 illustrates a block diagram of a second system in accordance with an embodiment of the present invention.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550.

Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) hardware 1572 and 1582, respectively. Processor 1570 also includes as part of its bus controller hardware point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) hardware), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage hardware 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
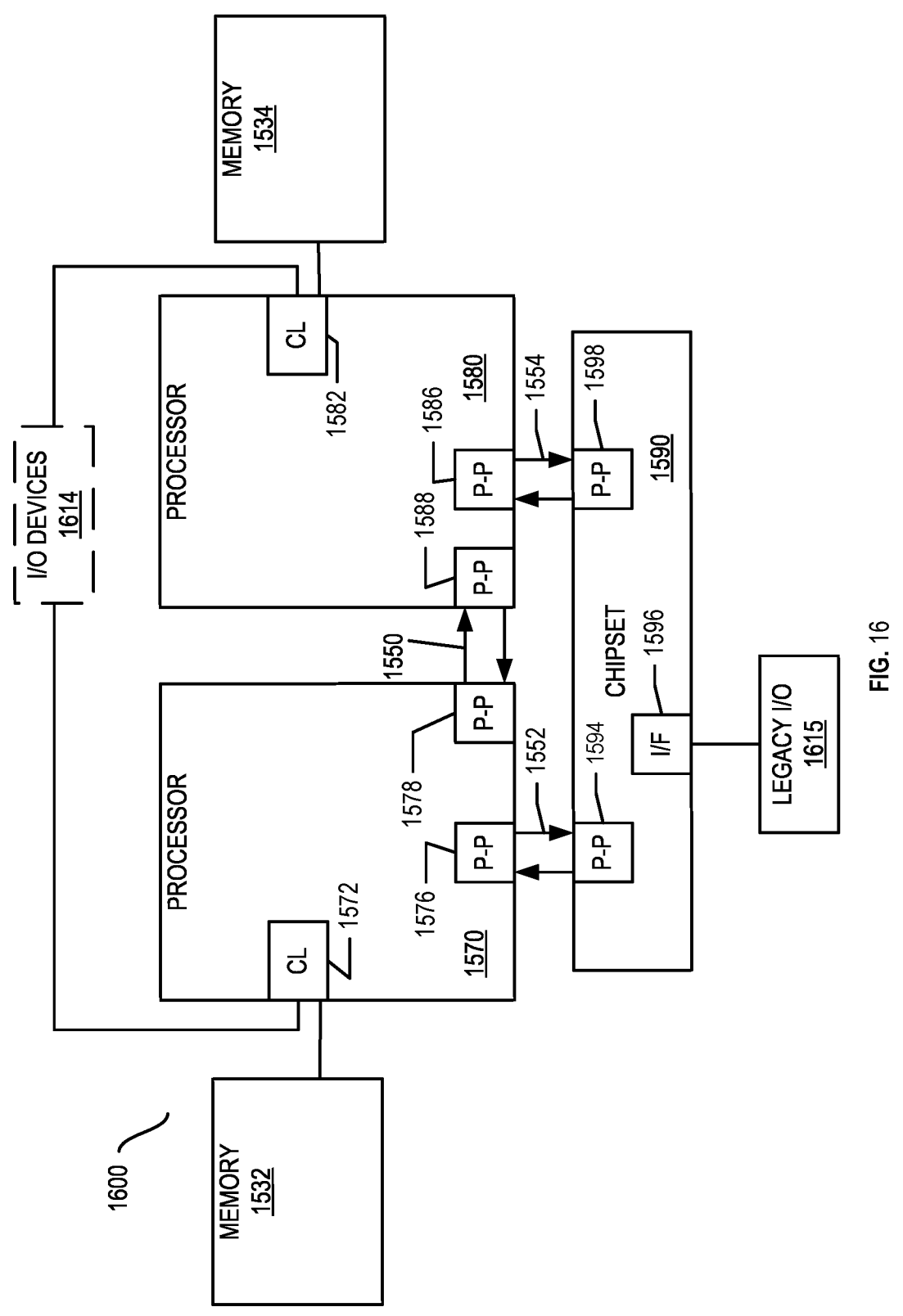
FIG. 16 illustrates a block diagram of a third system in accordance with an embodiment of the present invention.

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller hardware and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
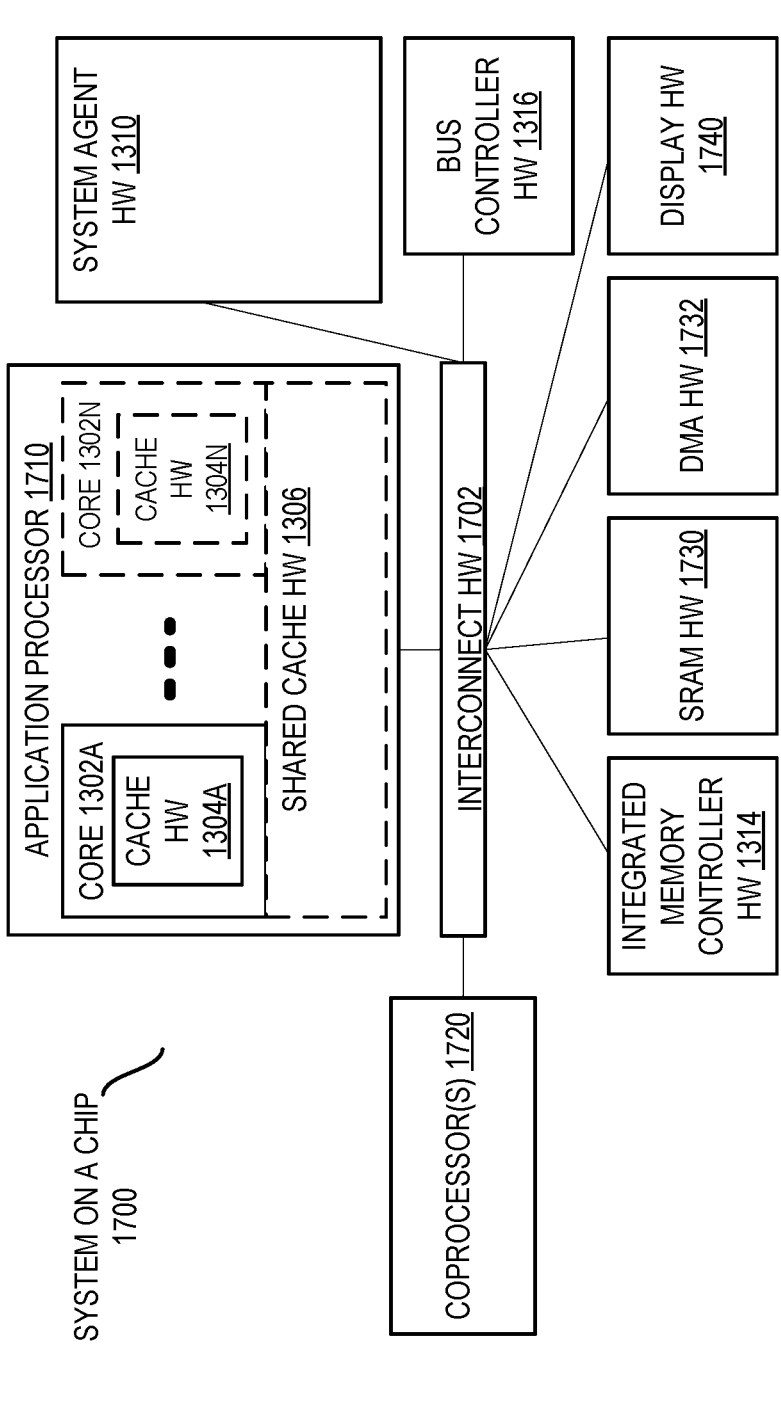
FIG. 17 illustrates a block diagram of a system on a chip (SoC) in accordance with an embodiment of the present invention.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect hardware 1702 is coupled to: an application processor 1710 which includes a set of one or more cores 1302A-N and shared cache hardware 1306; a system agent hardware 1310; a bus controller hardware 1316; an integrated memory controller hardware 1314; a set or one or more coprocessors 1720 which may include integrated graphics logic, an image processor, an audio processor, and a video processor; an static random access memory (SRAM) hardware 1730; a direct memory access (DMA) hardware 1732; and a display hardware 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
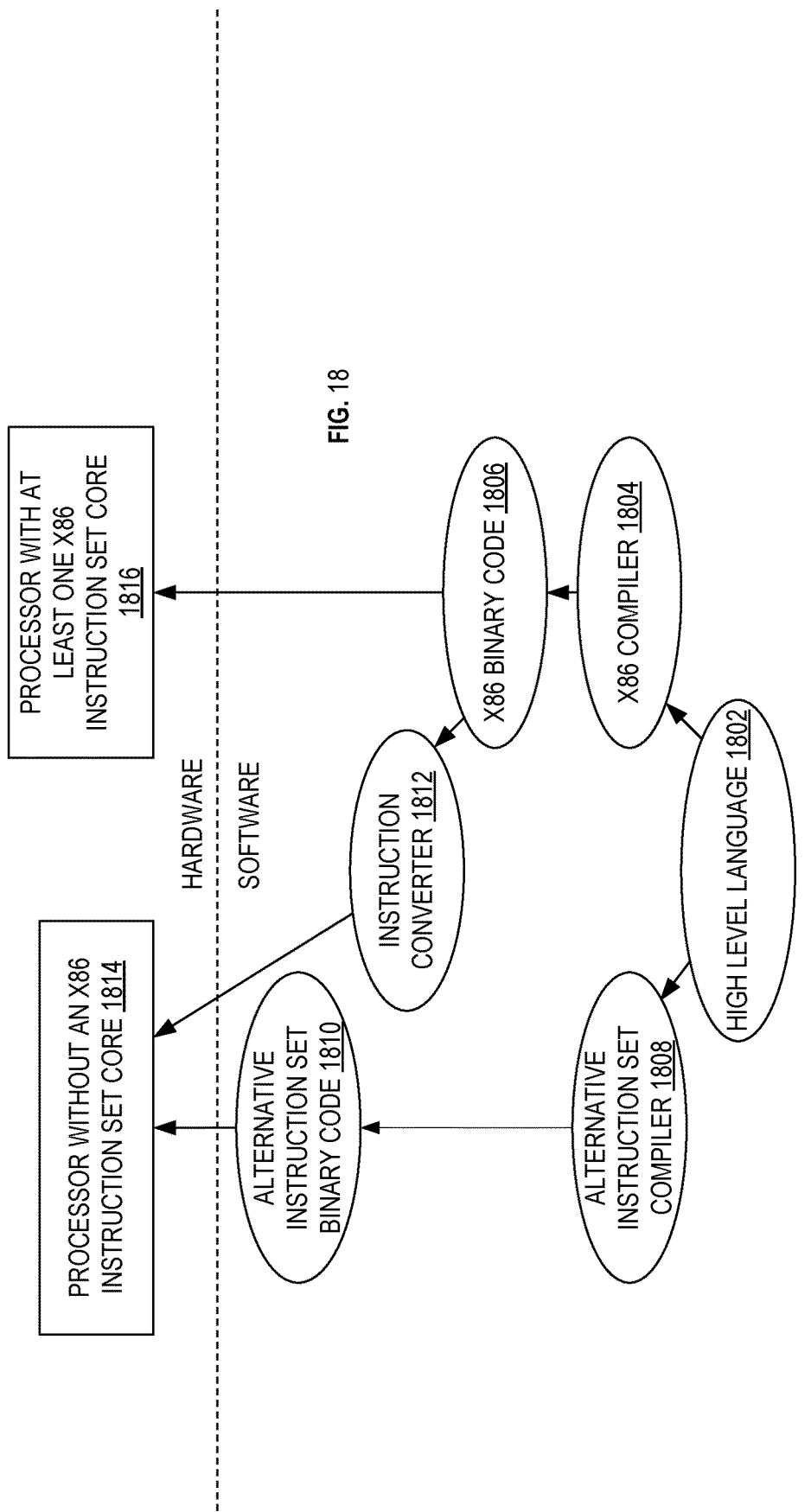
FIG. 18 illustrates a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. An apparatus comprising:
   a first source register to store a first plurality of data elements;
   a second source register to store a second plurality of data elements;
   a third source register to store one or more shift values;
   decoder circuitry to decode a first instruction specifying the first, second, and third source registers, a direction of bit-shifting, and a number of bits to be concatenated, wherein the first and second plurality of data elements in the first and second source registers each comprises a plurality of fields; and
   execution circuitry to execute the decoded first instruction, the execution circuitry comprising:
      concatenation circuitry to concatenate a first field from the plurality of fields within each of the first plurality of data elements with a second field from the plurality of fields within a corresponding data element of the second plurality of data elements based on the number of bits specified in the first instruction to generate a plurality of concatenated results; and
      shift circuitry to shift each of the plurality of concatenated results in the direction of bit-shifting specified in the first instruction by a number of bit positions specified by a corresponding one of the one or more shift values to generate a plurality of shifted results, wherein a select plurality of bits from each of the plurality of shifted results is stored in a corresponding data element position of a destination register.

2. The apparatus of claim 1, wherein the first and second plurality of data elements are quadword data elements.

3. The apparatus of claim 1, wherein each of the first and second fields comprises N consecutive bits as the number of bits to be concatenated.

4. The apparatus of claim 3, wherein N is specified by the first instruction or identified by an opcode associated with the first instruction.

5. The apparatus of claim 3, wherein N is less than a number of bits in a data element of the first and second plurality of data elements.

6. The apparatus of claim 3, wherein N is 52.

7. The apparatus of claim 3, further comprising:

a temporary register of 2*N bits to store one of the plurality of concatenated results or shifted results.

8. The apparatus of claim 3, wherein the first instruction or an opcode associated with the first instruction is to specify the direction of the shift as either left or right.

9. The apparatus of claim 8, wherein the select plurality of bits comprises lower consecutive M bits of a first corresponding shifted result of the plurality of shifted results when the shift is a right shift and comprises upper consecutive M bits of a second corresponding shifted result of the plurality of shifted results when the shift is a left shift.

10. The apparatus of claim 9, wherein M is equal to a number of bits in each data element of the first and second plurality of data elements.

11. The apparatus of claim 9, further comprising:

extension circuitry to zero extend the select plurality of bits from M bits to the number of bits in the data element of the first and second plurality of data elements prior to storing the select plurality of bits in the destination register.

12. The apparatus of claim 1, further comprising:

a mask register to store a mask to identify the first and second plurality of data elements from the first and second source registers.

13. The apparatus of claim 1, wherein the shift circuitry is to shift each of the plurality of concatenated results by a number of bit positions specified by a same shift value to generate the plurality of shifted results.

14. The apparatus of claim 1, wherein the destination register is a same register for storing the first or the second plurality of data elements.

15. A method comprising:

decoding a first instruction, the first instruction specifying a first source register storing a first plurality of data elements, a second source register storing a second plurality of data elements, a third source register storing one or more shift values, a direction of bit-shifting, and a number of bits to be concatenated, wherein the first and second plurality of data elements in the first and second source registers each comprises a plurality of fields;

executing the decoded first instruction;

concatenating a first field from the plurality of fields within each of the first plurality of data elements with a second field from the plurality of fields within a corresponding data element of the second plurality of data elements based on the number of bits specified in the first instruction to generate a plurality of concatenated results;

shifting each of the plurality of concatenated results in the direction of bit-shifting specified in the first instruction by a number of bit positions specified by a corresponding one of the one or more shift values to generate a plurality of shifted results; and storing a select plurality of bits from each of the plurality of shifted results in a corresponding data element position of a destination register.

16. The method of claim 15, wherein the first and second plurality of data elements are quadword data elements.

17. The method of claim 15, wherein each of the first and second fields comprises N consecutive bits as the number of bits to be concatenated.

18. The method of claim 17, wherein N is specified by the first instruction or identified by an opcode associated with the first instruction.

19. The method of claim 17, wherein N is less than a number of bits in a data element of the first and second plurality of data elements.

20. The method of claim 17, wherein N is 52.

21. The method of claim 17, further comprises:

storing one of the plurality of concatenated results or shifted results in a temporary register of 2*N bits.

22. The method of claim 17, wherein the first instruction or an opcode associated with the first instruction is to specify a direction of the shift as either left or right.

23. The method of claim 22, wherein the select plurality of bits comprises lower consecutive M bits of a first corresponding shifted result of the plurality of shifted results when the shift is a right shift and comprises upper consecutive M bits of a second corresponding shifted result of the plurality of shifted results when the shift is a left shift.

24. The method of claim 23, wherein M is equal to a number of bits in each data element of the first and second plurality of data elements.

25. The method of claim 23, further comprises:

zero extending the select plurality of bits from M bits to the number of bits in the data element of the first and second plurality of data elements prior to storing the select plurality of bits in the destination register.

* * * * *